(12) United States Patent
Kim et al.

(10) Patent No.: US 12,500,241 B2
(45) Date of Patent: Dec. 16, 2025

(54) SECONDARY BATTERY

(71) Applicant: LG Energy Solution, Ltd., Seoul (KR)

(72) Inventors: Hak-Yoon Kim, Daejeon (KR);
Seong-Wook Kang, Daejeon (KR);
Dong-Oh Shin, Daejeon (KR);
Nam-Jeong Lee, Daejeon (KR);
Moon-Soo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/048,203

(22) Filed: Feb. 7, 2025

(65) Prior Publication Data
US 2025/0183312 A1    Jun. 5, 2025

Related U.S. Application Data

(63) Continuation of application No. 18/833,496, filed as application No. PCT/KR2023/001367 on Jan. 30, 2023.

(30) Foreign Application Priority Data

Jan. 28, 2022  (KR) ........................ 10-2022-0013753
Mar. 14, 2022  (KR) ........................ 10-2022-0031625

(51) Int. Cl.
*H01M 4/62*  (2006.01)
*H01M 4/02*  (2006.01)
(Continued)

(52) U.S. Cl.
CPC ......... *H01M 4/623* (2013.01); *H01M 4/0419* (2013.01); *H01M 4/131* (2013.01);
(Continued)

(58) Field of Classification Search
CPC ........... H01M 4/131; H01M 2004/028; H01M 4/621–623
See application file for complete search history.

(56) References Cited

U.S. PATENT DOCUMENTS

2005/0064289 A1 * 3/2005 Suzuki ............... H01M 4/139
                                                    252/182.1
2014/0322606 A1   10/2014 Lee et al.
                        (Continued)

FOREIGN PATENT DOCUMENTS

CN      113659104 A    11/2021
JP    2017-216233 A    12/2017
                        (Continued)

OTHER PUBLICATIONS

Machine translation of WO 2019/244282 A1 (Year: 2019).*
(Continued)

*Primary Examiner* — Robert S Carrico
(74) *Attorney, Agent, or Firm* — Lerner David LLP

(57) ABSTRACT

Provided is a secondary battery including: a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material; a negative electrode including a negative electrode current collector and a negative electrode active material layer located on the negative electrode current collector and including a plurality of granules including a negative electrode active material and a negative electrode binder, and formed as the negative electrode binder binds the negative electrode active material; and a separator disposed between the positive electrode and the negative electrode.

18 Claims, 5 Drawing Sheets

(51) Int. Cl.
  *H01M 4/04*    (2006.01)
  *H01M 4/131*   (2010.01)
  *H01M 10/052*  (2010.01)
(52) U.S. Cl.
  CPC ......... *H01M 4/625* (2013.01); *H01M 10/052*
    (2013.01); *H01M 2004/021* (2013.01); *H01M*
    *2004/028* (2013.01)

(56) References Cited

U.S. PATENT DOCUMENTS

| | | | |
|---|---|---|---|
| 2015/0061176 A1 | 3/2015 | Bruckner et al. | |
| 2015/0086875 A1 | 3/2015 | Yoshida | |
| 2015/0287995 A1* | 10/2015 | Kourtakis | H01M 4/13 427/122 |
| 2017/0170452 A1 | 6/2017 | Uchida et al. | |
| 2019/0131628 A1 | 5/2019 | Sugihara | |
| 2019/0140254 A1 | 5/2019 | Kim et al. | |
| 2019/0386312 A1* | 12/2019 | Kuzuoka | C08F 20/44 |
| 2020/0075930 A1 | 3/2020 | Kim et al. | |
| 2020/0274164 A1* | 8/2020 | Nakano | H01M 4/0404 |
| 2020/0321599 A1 | 10/2020 | Kim et al. | |
| 2020/0365900 A1 | 11/2020 | Yawata et al. | |
| 2021/0098770 A1 | 4/2021 | Yudi et al. | |
| 2023/0108728 A1 | 4/2023 | Jin et al. | |

FOREIGN PATENT DOCUMENTS

| | | |
|---|---|---|
| KR | 2014-0136952 A | 12/2014 |
| KR | 20160040380 A | 4/2016 |
| KR | 20160040830 A | 4/2016 |
| KR | 2017-0028978 A | 3/2017 |
| KR | 20180067428 A | 6/2018 |
| KR | 20190035579 A | 4/2019 |
| KR | 2019-0049546 A | 5/2019 |
| KR | 20190097765 A | 8/2019 |
| KR | 2020-0024980 A | 3/2020 |
| KR | 20210006899 A | 1/2021 |
| KR | 20210156340 A | 12/2021 |
| WO | 2013146916 A1 | 10/2013 |
| WO | 2015-161289 A1 | 10/2015 |
| WO | 2019188488 A1 | 10/2019 |
| WO | 2019244282 A1 | 12/2019 |
| WO | 2021028619 A1 | 2/2021 |
| WO | 2021192541 A1 | 9/2021 |

OTHER PUBLICATIONS

International Search Report for Application No. PCT/KR2023/001367 mailed May 9, 2023. 3 pgs.

Office Action (Request for the Submission of an Opinion) for Korean Application No. 10-2023-0012207 issued Mar. 27, 2024, pp. 1-13.

Office Action (Request for the Submission of an Opinion) for Korean Application No. 10-2023-0012207 issued Dec. 10, 2024, pp. 1-3.

Notice of Allowance (Written Decision on Registration) for Korean Application No. 10-2023-0012207 issued Dec. 24, 2024, pp. 1-7.

* cited by examiner

SECONDARY BATTERY

CROSS-REFERENCE TO RELATED APPLICATION(S)

The present application is a continuation of U.S. application Ser. No. 18/833,496 filed on Jul. 26, 2024, which is a national phase entry under 35 U.S.C. § 371 of International Application No. PCT/KR2023/001367, filed on Jan. 30, 2023, which claims priority from Korean Patent Application No. 10-2022-0031625, filed on Mar. 14, 2022, and Korean Patent Application No. 10-2022-0013753, filed on Jan. 28, 2022, all of which are incorporated herein by reference.

TECHNICAL FIELD

The present disclosure relates to a secondary battery, particularly to a secondary battery which can be charged rapidly and has improved lifespan characteristics.

BACKGROUND ART

Due to the rapid increase in the use of fossil fuels, the demand for the use of alternative energy and clean energy is increasing. In this regard, the most actively researched areas are power generation and storage using electrochemistry. At present, a secondary battery is a representative example of electrochemical devices using such electrochemical energy and its use is expanding gradually. A lithium secondary battery, which is a representative secondary battery, is used not only as an energy source for mobile devices but also as a power source for electric vehicles or hybrid electric vehicles that can replace the vehicles using fossil fuels such as gasoline, diesel, etc., which are one of the main causes of air pollution. In addition, its use is expanding to applications such as auxiliary power sources through gridization.

The manufacturing process of the lithium secondary battery is largely divided into three steps: an electrode manufacturing process, an electrode assembly manufacturing process, and a formation process. The electrode manufacturing process is subdivided into an electrode mixture mixing process, an electrode coating process, a drying process, a rolling process, a slitting process, a winding process, etc.

Among them, the electrode mixture mixing process is a process wherein the components for forming an electrode active layer, in which the actual electrochemical reaction occurs in the electrode, are mixed. Specifically, an electrode active material, which is the essential element of the electrode, is mixed with additives such as a conductive material, a filler, a binder for binding between powders and adhesion to a current collector, a solvent for imparting viscosity and dispersing powders, etc. to prepare a slurry having fluidity.

The slurry is coated on the electrically conductive current collector in the electrode coating process, and the solvent contained in the electrode mixture slurry is removed in the drying process. Finally, the electrode is rolled to produce an electrode with a predetermined thickness.

In the conventional electrode manufacturing process, the drying process of drying the solvent contained in the slurry has the problem that the distribution of materials is not uniform in the direction of the electrode layer thickness due to uneven shrinkage of the electrode, difference in the evaporation rate of the solvent, or migration of materials, particularly the binder, to the electrode surface, resulting in surface and edge defects of the electrode, decreased adhesion to the current collector, etc.

DISCLOSURE

Technical Problem

The present disclosure is designed to solve the problems of the related art, and therefore the present disclosure is directed to providing a secondary battery which can be charged rapidly and has improved lifespan characteristics.

Technical Solution

The present disclosure provides a secondary battery according to the following exemplary embodiments.

According to a first exemplary embodiment, there is provided a secondary battery including:
  a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;
  a negative electrode comprising a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and
  a separator disposed between the positive electrode and the negative electrode.

According to a second exemplary embodiment, in the first exemplary embodiment, the positive electrode may have a bending resistance lower than 10 mm Φ.

According to a third exemplary embodiment, in the second exemplary embodiment, the bending resistance of the positive electrode may be evaluated according to JIS K5600-5-1.

According to a fourth exemplary embodiment, in the second or third exemplary embodiment, the bending resistance of the positive electrode may be evaluated through:
  a step of preparing a rectangular positive electrode sample with a size of 100 mm×50 mm;
  a step of preparing measuring rods having diameters of 2, 3, 4, 5, 6, 8, 10, 12, 16, 20, 25 and 32 mm respectively, contacting the measuring rod with the largest diameter to the positive electrode sample, and determining whether crack occurs in a mixed film of the positive electrode sample when both ends of the positive electrode sample are lifted; and
  a step of repeating the step of determining whether crack occurs in the mixed film of the positive electrode sample using the measuring rod with the next largest diameter if crack has not occurred in the previous step and determining the minimum diameter of the measuring rod when no crack occurs in the mixed film of the positive electrode sample as the bending resistance.

According to a fifth exemplary embodiment, in any of the first to fourth exemplary embodiments, the positive electrode active material layer may have a porosity of 20-35%.

According to a sixth exemplary embodiment, in any of the first to fifth exemplary embodiments, the loading amount of the positive electrode active material in the positive electrode active material layer may be 3-15 mAh/cm$^2$.

According to a seventh exemplary embodiment, in any of the first to sixth exemplary embodiments, the interfacial resistance between the positive electrode active material layer and the positive electrode current collector may be 5 $\Omega \cdot cm^2$ or lower.

According to an eighth exemplary embodiment, in any of the first to seventh exemplary embodiments, the positive electrode binder included in the positive electrode active material layer may have a crystallinity of 10% or lower.

According to a ninth exemplary embodiment, in any of the first to eighth exemplary embodiments, the positive electrode active material layer may include a positive electrode active material, a positive electrode conductive material and a fluorine-based positive electrode binder, the positive electrode active material layer may have a positive electrode QBR (quantified binder ratio) of 1.1 or lower, and the positive electrode QBR may be defined by the following equation:

$$\text{Positive electrode } QBR = CB_s/CB_f$$

wherein $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer.

According to a tenth exemplary embodiment, in any of the first to ninth exemplary embodiments, the binder included in the positive electrode active material layer may include polytetrafluoroethylene (PTFE).

According to an eleventh exemplary embodiment, in any of the first to tenth exemplary embodiments, the conductive material included in the positive electrode active material layer may include one or more of activated carbon, graphite, carbon black, ketjen black or carbon nanotube.

According to a twelfth exemplary embodiment, in any of the first to eleventh exemplary embodiments, the positive electrode active material layer may include 85-98 parts by weight of a positive electrode active material, 0.5-5 parts by weight of a conductive material and 0.5-10 parts by weight of a binder.

According to a thirteenth exemplary embodiment, in any of the first to twelfth exemplary embodiments, a conductive primer may be coated on the positive electrode current collector wholly or partially.

According to a fourteenth exemplary embodiment, in any of the first to thirteenth exemplary embodiments, the positive electrode may be a dry electrode prepared by a dry method.

According to a fifteenth exemplary embodiment, in any of the first to fourteenth exemplary embodiments, the positive electrode may be prepared by a method including:

a step of preparing a mixture including a positive electrode active material, a conductive material and a binder;

a step of preparing a mixture lump by kneading the mixture at 70-200° C. under normal pressure or higher pressure;

a step of obtaining a mixture powder for a positive electrode by grinding the mixture lump;

a step of forming a film for a positive electrode by calendering the mixture powder for a positive electrode between a plurality of rolls; and a step of laminating the film for a positive electrode on a metal current collector.

According to a sixteenth exemplary embodiment, in the fifteenth exemplary embodiment, the step of preparing the mixture lump by kneading may be performed in a kneader under normal pressure or higher pressure.

According to a seventeenth exemplary embodiment, in the fifteenth or sixteenth exemplary embodiment, in the lamination step, the compression ratio of the film for a positive electrode may be 30-50%.

According to an eighteenth exemplary embodiment, in any of the fifteenth to seventeenth exemplary embodiments, the rolling ratio of the film for a positive electrode may be 20% or lower.

According to a nineteenth exemplary embodiment, in any of the fifteenth to eighteenth exemplary embodiments, the increase in apparent density before and after the lamination of the film for a positive electrode and the current collector may be 5-30%.

According to a twentieth exemplary embodiment, in any of the fifteenth to nineteenth exemplary embodiments, the lamination step may be performed by a lamination roller at 25-250° C.

According to a twenty-first exemplary embodiment, in any of the first to nineteenth exemplary embodiments, the granule included in the negative electrode may have: a core part including the negative electrode active material; and a surface part located wholly or partially outside the core part and including a binder binding the negative electrode active material.

According to a twenty-second exemplary embodiment, in any of the first to twenty-first exemplary embodiments, the binder included in the surface part of the granule may be connected with the binder in the surface part of the neighboring granule, so that the binder is distributed in the active material layer to have a network structure.

According to a twenty-third exemplary embodiment, in any of the first to twenty-second exemplary embodiments, the negative electrode active material layer may include a negative electrode active material and a negative electrode binder, the negative electrode binder may have a double bond, the negative electrode active material layer may have a negative electrode QBR (quantified binder ratio) of 2.0 or lower, and the negative electrode QBR may be defined by the following equation:

$$\text{Negative electrode } QBR = AB_s/AB_f$$

wherein $AB_s$ is the average double bond content of the negative electrode binder in the surface region of the negative electrode active material layer from the outermost surface of the negative electrode active material layer to 15% of the total thickness of the negative electrode active material layer, and $AB_f$ is the average double bond content of the negative electrode binder in the floor region of the negative electrode active material layer from the interface of the negative electrode active material layer contacting with the negative electrode current collector to the 15% of the total thickness of the negative electrode active material layer.

According to a twenty-fourth exemplary embodiment, in any of the first to twenty-third exemplary embodiments, the granule may have a higher electrode binder content (wt %) in a surface part than in a core part based on 100 wt % of the negative electrode active material and the negative electrode binder, and the surface part may be a region near the surface of the granule from the granule surface to a predetermined depth toward the center of the granule, and the core part may be a region other than the surface part.

According to a twenty-fifth exemplary embodiment, in any of the first to twenty-fourth exemplary embodiments, the negative electrode binder may include one or more of a diene-based polymer, an acrylate-based polymer ora styrene-based polymer.

According to a twenty-sixth exemplary embodiment, in any of the first to twenty-fifth exemplary embodiments, the negative electrode active material layer may include a plurality of granules comprising a negative electrode active material, a negative electrode conductive material, and a negative electrode binder, and formed as the negative electrode binder binds the negative electrode active material and the negative electrode conductive material.

According to a twenty-seventh exemplary embodiment, in the twenty-sixth exemplary embodiment, the negative electrode conductive material may include one or more of activated carbon, graphite, carbon black, ketjen black or carbon nanotube.

According to a twenty-eighth exemplary embodiment, in the twenty-sixth or twenty-seventh exemplary embodiment, the negative electrode active material layer may include 85-98 parts by weight of a negative electrode active material, 0.5-5 parts by weight of a negative electrode conductive material and 0.5-10 parts by weight of a negative electrode binder.

According to a twenty-ninth exemplary embodiment, in any of the first to twenty-eighth exemplary embodiments, a primer layer may be formed wholly or partially on at least one side of the negative electrode current collector, the primer layer may include a binder and a conductive material, and the sum of the contents of the binder and the conductive material based on the total weight of the primer layer may be 90 wt % or larger.

According to a thirtieth exemplary embodiment, in any of the first to twenty-ninth exemplary embodiments, the negative electrode may be a dry electrode prepared by a method including:

a step of preparing a slurry by mixing a negative electrode active material and a negative electrode binder with a dispersion medium;

a step of preparing an initial granule by spray-drying the slurry;

a step of coating the initial granule on a current collector; and a step of forming a negative electrode active material layer including a rolled granule by rolling the coated initial granule.

According to a thirty-first exemplary embodiment, in any of the first to thirtieth exemplary embodiments, the slurry may further contain a negative electrode conductive material.

According to a thirty-second exemplary embodiment, there is provided an energy storage device including the secondary battery according to any of the first to thirty-first exemplary embodiments as a unit cell.

Advantageous Effects

A secondary battery according to an exemplary embodiment of the present disclosure, wherein dry electrodes prepared without a process of drying a solvent when active material layers are formed on current collectors for both a positive electrode and a negative electrode are used, exhibits low initial resistance, low voltage rise during rapid charging and, at the same time, can exhibit improved lifespan characteristics as compared to a secondary battery using at least one wet electrode for a positive electrode and a negative electrode, which requires a process of drying a solvent when active material layers are formed on current collectors.

Specifically, the secondary battery according to an exemplary embodiment of the present disclosure uses a positive electrode using a fiberized binder and a negative electrode prepared using a granule. The positive electrode using a fiberized binder exhibits improved electrochemical reaction rate and the negative electrode prepared using a granule also exhibits fast reaction rate corresponding thereto. As a result, the electrochemical reaction rates of the positive electrode and the negative electrode are balanced, and the overall lifespan characteristics of the secondary battery can be improved remarkably.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Figure 1:
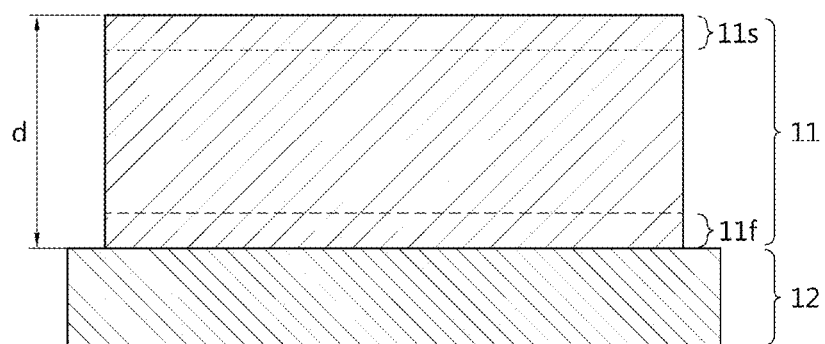
FIG. 1 schematically shows an electrode according to an exemplary embodiment of the present disclosure.

Hereinafter, the present disclosure is described more specifically to help understanding the present disclosure.

The terms or words used the present specification and claims should not be construed as being limited to their ordinary or dictionary meanings. Rather, they should be interpreted as the meanings and concepts consistent with the technical idea of the present disclosure based on the principle that an inventor can properly define the concepts of terms in order to best explain his/her invention.

The terms used in the present specification are used only to describe exemplary embodiments, and are not intended to limit the present disclosure. Singular expressions include plural expressions unless the context clearly indicates otherwise.

In addition, throughout the present specification, when a part is described to 'include' a certain component, it means that it may further include other components without excluding other component, unless stated otherwise.

In addition, the terms 'about', 'substantially', etc. used throughout the present specification to describe allowable errors of numerical values are used to aid understanding of the present disclosure and to prevent exploitation of the present disclosure by unscrupulous infringers.

Throughout the present specification, the description 'A and/or B' means 'A or B or both'.

The specific terms used in the present specification are for convenience, not for limitation. The terms such as 'upper', 'lower', 'before', 'after', 'inside' and 'outside' are used to describe the relative position or direction of each component, rather than absolute position or direction, in the relevant drawings. The terms include, in addition to themselves, words containing them, their derivatives and words with similar meanings.

In the present specification, 'glass transition temperature ($T_g$)' is measured by a common method known in the art, for example, by differential scanning calorimetry (DSC).

In the present specification, the term 'porosity' means the ratio of the volume occupied by pores to the total volume of a structure. Vol % is used as its unit. In the present disclosure, the method for measuring the porosity is not specially limited. For example, it may be measured by the BET (Brunauer-Emmett-Teller) method using nitrogen gas, mercury (Hg) porosimetry or ASTM D-2873. Alternatively, after calculating the net density of a separator from the apparent density of the separator, the composition of materials included in the separator and the density of the components, the porosity of the separator may be calculated from the difference in the apparent density and the net density.

In the present specification, 'average particle diameter ($D_{50}$)' means the particle diameter at the 50% point in the cumulative distribution of the number of particles according to particle diameter, and the particle diameter may be measured by the laser diffraction method. Specifically, after dispersing the powder to be measured in a dispersion medium, particle size distribution is determined by measuring the difference in diffraction patterns depending on particle size when the particle passes through a laser beam using a commercially available laser diffraction particle size measuring device (e.g., Microtrac S3500). The particle diameter $D_{50}$ may be measured by calculating the particle diameter at the point where the cumulative distribution of the number of particles is 50%.

The 'thickness' of each layer included in the electrode used in the present specification may be measured by a known method for measuring thickness. For example, the thickness may be measured using a thickness measuring device (VL-50S-B, Mitutoyo).

In the present specification, 'specific surface area' may be measured by a known method for measuring specific surface area. For example, the specific surface area may be measured by a flowing method or a fixation method, although not being limited thereto.

The present disclosure relates to an electrode and an electrochemical device including the electrode. The electrochemical device of the present disclosure includes any device that undergoes an electrochemical reaction. Specific examples include all types of primary batteries, secondary batteries, fuel cells, solar cells, capacitors such as supercapacitors, etc. In the present disclosure, the electrochemical device may be specifically a secondary battery, more specifically a lithium-ion secondary battery.

A positive electrode and a negative electrode used in the conventional secondary battery are prepared by an electrode manufacturing process wherein a slurry including an active material, a binder, a conductive material and a solvent (dispersion medium) is coated on at least one side of a current collector and then the dispersion medium included in the slurry is dried. An electrode prepared by this electrode manufacturing process is called a wet electrode. The wet electrode, which requires the drying process, has the problem that the distribution of the binder is not uniform in the direction of the electrode layer thickness due to difference in the evaporation rate of the solvent, or migration of the binder the electrode surface, resulting in surface and edge defects of the electrode and decreased adhesion of the electrode layer to the current collector. Therefore, a secondary battery equipped with the wet electrodes as a positive electrode and a negative electrode have limitations in lifespan characteristics, rapid charging characteristics and resistance characteristics.

In order to solve the problems of the conventional secondary battery equipped with the wet electrode, the inventors of the present disclosure have designed a secondary battery including a dry electrode prepared by a dry process requiring no drying process for removing a solvent when forming an active material layer on a current collector for a positive electrode or a negative electrode. In particular, the positive electrode and negative electrode included in the secondary battery of the present disclosure are prepared by a dry electrode preparation process and have different composition and structure. Specifically, the positive electrode is a dry electrode wherein a fiberized binder is introduced in a positive electrode active material layer for binding the active material, and the negative electrode is a dry electrode wherein a plurality of granules including an active material and a binder are introduced in a negative electrode active material layer.

Since the fiberized binder used in the positive electrode reacts with lithium ions in the negative electrode operating potential region of the lithium secondary battery and lowers the overall efficiency of the secondary battery, it is technically very difficult to use the fiberized binder used in the positive electrode for the negative electrode.

On the other hand, the following problems occur if the granules used in the negative electrode are used in the positive electrode. In the step of preparing the granules by drying a slurry using a spray dryer, when an organic solvent such as N-methyl-2-pyrrolidone (NMP) is used as a dispersion medium, there is a risk of explosion due to the high boiling point of the organic solvent. And, when an aqueous solvent such as water is used as the dispersion medium, the cell capacity decreases. In addition, since the granules used in the negative electrode have high hardness and the positive electrode active material is sensitive to external force, the use of the granules for the preparation of the positive electrode is limited because an appropriate level of pressure cannot be applied during rolling. Accordingly, it is more advantageous to use a fiberized binder that can be prepared at a relatively low pressure for the preparation of the positive electrode.

In consideration of the above-described factors, according to an aspect of the present disclosure, there is provided a secondary battery including:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode comprising a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode.

Hereinafter, the positive electrode and the negative electrode included in the secondary battery of the present disclosure will be described in detail.

The positive electrode includes a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material.

The positive electrode of the present disclosure includes a fiberized binder in the positive electrode active material layer as a means of binding the positive electrode active material and the positive electrode conductive material. The fiberized binder is less prone to breakage than the conventional non-fiberized binder and has superior stretchability in the length direction. Therefore, the flexibility of the positive electrode active material layer and the positive electrode including the same may be improved greatly. The fiberization process of the binder will be explained specifically in the method for preparing a positive electrode described later.

The positive electrode active material is not limited as long as it is a lithium transition metal oxide, a lithium metal iron phosphate or a metal oxide. Examples may include a layered compound such as lithium cobalt oxide ($LiCoO_2$), lithium nickel oxide ($LiNiO_2$), etc. or a compound substituted with one or more transition metal; a lithium manganese oxide such as $Li_{1+x}Mn_{2-x}O_4$ (wherein $0 \leq x \leq 0.33$), $LiMnO_3$, $LiMn_2O_3$, $LiMnO_2$, etc.; lithium copper oxide ($Li_2CuO_2$); a vanadium oxide such as $LiV_3O_8$, $LiV_3O_4$, $V_2O_5$, $Cu_2V_2O_7$, etc.; a Ni-site lithium nickel oxide represented by $LiNi_{1-x}M_xO_2$ (wherein M is Co, Mn, Al, Cu, Fe, Mg, B or Ga and $0.01 \leq x \leq 0.3$); a lithium manganese composite oxide represented by $LiMn_{2-x}M_xO_2$ (wherein M is Co, Ni, Fe, Cr, Zn or Ta and $0.01 \leq x \leq 0.1$) or $Li_2Mn_3MO_8$ (wherein M is Fe, Co, Ni, Cu or Zn); $Li_{1+x}(Ni_aCo_bMn_cAl_d)_{1-x}O_2$ (wherein $0 \leq x \leq 0.03$, $0.3 \leq a \leq 0.95$, $0.01 \leq b \leq 0.35$, $0.01 \leq c \leq 0.5$, $0.001 \leq d \leq 0.03$ and $a+b+c+d=1$) with some of Li being replaced with aluminum ions; a lithium metal phosphate $LiMPO_4$ (wherein M is Fe, CO, Ni or Mn); a disulfide compound; $Fe_2(MoO_4)_3$; etc., although not being limited thereto.

The positive electrode conductive material is not specially limited as long as it has conductivity without causing chemical change in the battery. Examples may include graphite such as natural graphite, artificial graphite, etc.; carbon black such as acetylene black, ketjen black, channel black, furnace black, lamp black, thermal black, etc.; conductive fiber such as carbon fiber, metallic fiber, etc.; fluorinated carbon; metal powder such as, aluminum, nickel powder, etc.; conductive whisker such as zinc oxide, potassium titanate, etc.; a conductive metal oxide such as titanium oxide, etc.; a conductive material such as a polyphenylene derivative, etc. Specifically, one or more selected from a group consisting of activated carbon, graphite, carbon black and carbon nanotube may be used for uniform mixing and improved conductivity of the conductive material. More specifically, activated carbon may be used.

The positive electrode binder may include polytetrafluoroethylene (PTFE), polyolefin or a mixture thereof, specifically polytetrafluoroethylene (PTFE).

Specifically, the polytetrafluoroethylene (PTFE) may be included in an amount of 60 wt % or more based on the total weight of the binder.

Of course, the positive electrode binder may further include PEO (polyethylene oxide), PVDF (polyvinylidene fluoride), PVDF-HFP (polyvinylidene fluoride-co-hexafluoropropylene), etc.

In an exemplary embodiment of the present disclosure, the content of the positive electrode active material may be 85-98 parts by weight, the content of the positive electrode conductive material may be 0.5-5 parts by weight, and the content of the positive electrode binder may be 0.5-10 parts by weight. In addition, the content of the positive electrode active material may be 90-98 parts by weight, the content of the positive electrode conductive material may be 0.5-5 parts by weight, and the content of the positive electrode binder may be 0.5-5 parts by weight.

When the contents of the positive electrode active material, the positive electrode conductive material and the positive electrode binder satisfy the above ranges, a mixture lump may be formed in the following kneading process as the positive electrode binder is sufficiently fiberized, an electrode film may be prepared easily through processing of the mixture powder formed through the grinding process, the physical properties of the electrode film may be ensured, the content of the positive electrode active material may be ensured, and enough conductivity may be ensured.

In some cases, a filler, which is a component that suppresses the expansion of the electrode, may be additionally added to the mixture. The filler is not specially limited as long as it is a fibrous material and does not cause chemical change in the battery. For example, a fibrous material such as an olefin-based polymer, e.g., polyethylene, polypropylene, etc., glass fiber, carbon fiber, etc. is used.

In an exemplary embodiment of the present disclosure, the positive electrode may have a bending resistance of lower than 10 mm Φ, 8 mm Φ or lower, 5 mm Φ or lower, 2-8 mm Φ, 2-5 mm Φ, or 2-3 mm Φ.

The bending resistance of the positive electrode may be evaluated according to JIS K5600-5-1. Specifically, it may be evaluated by contacting the positive electrode with measuring rods having diameters of various diameters, determining whether crack occurs in the positive electrode active material layer when both ends of the positive electrode sample are lifted, and determining the smallest diameter at which no crack occurs.

In an exemplary embodiment of the present disclosure, the bending resistance of the positive electrode may be evaluated through:
- a step of preparing a rectangular positive electrode sample with a size of 100 mm×50 mm;
- a step of preparing measuring rods having diameters of 2, 3, 4, 5, 6, 8, 10, 12, 16, 20, 25 and 32 mm respectively, contacting the measuring rod with the largest diameter to the positive electrode sample, and determining whether crack occurs in a mixed film of the positive electrode sample when both ends of the positive electrode sample are lifted; and
- a step of repeating the step of determining whether crack occurs in the mixed film of the positive electrode sample using the measuring rod with the next largest diameter if crack has not occurred in the previous step and determining the minimum diameter of the measuring rod when no crack occurs in the mixed film of the positive electrode sample as the bending resistance.

In addition, the loading amount of the positive electrode active material in the positive electrode active material layer may be 3-15 mAh/cm$^2$, specifically 4-10 mAh/cm$^2$, 4-6 mAh/cm$^2$, 4-5 mAh/cm$^2$ or 4.8-4.9 mAh/cm$^2$.

The loading amount of the active material is calculated as follows.

Loading amount (mAh/cm$^2$)=[content of active material (mAh/g)]×[weight ratio (wt %) of active material in mixed film×weight of mixed film per unit area (g/cm$^2$)]

In addition, the interfacial resistance between the positive electrode active material layer and the current collector may be 5 Ω·cm$^2$ or lower, 4.3 Ω·cm$^2$ or lower, 4 Ω·cm$^2$ or lower, 3 Ω·cm$^2$ or lower, 1.3-4.3 Ω·cm$^2$, 1.3-1.8 Ω·cm$^2$ or 1.8-4.3 Ω·cm$^2$.

The interfacial resistance is a potential difference measured by the MP (multi-probe) resistance measurement method between 46 probes after applying a current of 100 μA is applied to the positive electrode.

If the interfacial resistance is higher than the above ranges, the performance of the prepared secondary battery may be unsatisfactory.

The current collector is not specially limited as long as it has high conductivity and does not cause chemical change in the battery. For example, stainless steel, aluminum, nickel, titanium, calcined carbon, copper or aluminum, or stainless steel surface-treated with carbon, nickel, titanium, silver, etc. may be used. Fine irregularities may be formed on the surface of the current collector to increase the adhesivity of the positive electrode active material. In addition, it may be in various forms such as a film, a sheet, a foil, a net, a porous material, a foam, a nonwoven, etc.

Furthermore, a conductive primer may be coated on the current collector wholly or partially in order to lower surface resistance and improve adhesivity.

The conductive prime may include a conductive material and a binder, and the conductive material is not limited as long as it is a material exhibiting conductivity. For example, it may be a carbon-based material.

The binder may include a fluorine-based binder (including PVDF and PVDF copolymers), an acryl-based binder, an aqueous binder (e.g., a diene-based rubber such as styrene-butadiene rubber (SBR), nitrile-butadiene rubber (NBR), etc.), etc. that can be dissolved in a solvent.

The positive electrode active material layer of the positive electrode may have a porosity of 20-50%, 20-45%, 20-40%, 20-35%, 22-30%, 20-28%, 20-26%, 23.1-27.4%, 23.1-24.8% or 24.8-27.4%. The porosity may be changed a little depending on the effect to be focused on.

When the porosity of the positive electrode active material layer is within the above ranges, excellent lifespan characteristics, output characteristics, etc. may be achieved due to improved electrolyte impregnation and it is advantageous in terms of energy density per volume since it is not necessary to increase the volume to achieve the same capacity.

The porosity of the positive electrode active material layer can be determined by the following equation from the apparent density of the mixed film only measured by subtracting the volume and weight of the current collector from the volume and weight of the electrode and the actual density calculated based on the actual density and composition of the components.

$$\text{Porosity (\%)} = \{1 - (\text{apparent density/actual density})\} \times 100$$

In an exemplary embodiment of the present disclosure, the positive electrode binder in the positive electrode active material layer may have a crystallinity of 10% or lower.

In the present disclosure, the crystallinity ($X_c$) may be measured by differential scanning calorimetry (DSC) and is based on the temperature (peak temperature) at which the highest enthalpy is exhibited during crystallization. Specifically, the crystallinity may be expressed in % by dividing the value of enthalpy of melting ($\Delta H_m$) measured by DSC by the value of enthalpy of melting ($\Delta H_m^0$) (equilibrium heat of melting) of theoretically perfect crystallization (100% crystallinity), and may be calculated by Equation 1. The value of enthalpy of melting of theoretically perfect crystallization can be found in the polymer handbook known in the art, and the value for an unknown or newly synthesized material may be calculated by the extrapolation method.

$$X_c(\%) = (\Delta H_m \div \Delta H_m^0) \times 100 \quad \text{[Equation 1]}$$

In an exemplary embodiment of the present disclosure, the positive electrode active material layer may include a positive electrode active material, a positive electrode conductive material and a fluorine-based positive electrode binder, and
- the positive electrode active material layer may have a positive electrode QBR (quantified binder ratio) of 1.1 or lower.

The positive electrode QBR is defined by the following equation.

$$\text{Positive electrode } QBR = CB_s/CB_f$$

In the above equation, $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer.

FIG. 1 schematically shows an electrode according to an exemplary embodiment of the present disclosure. Referring to FIG. 1, a positive electrode 10 includes a positive electrode current collector 12; and a positive electrode active material layer 11 located on the positive electrode current collector 12 and including a positive electrode active material, a positive electrode conductive material and a fluorine-containing positive electrode binder.

The positive electrode active material layer 11 has a positive electrode active material layer surface region 11s, from the outermost surface of the positive electrode active material layer to 15% of the total thickness d of the positive electrode active material layer, and a positive electrode active material layer floor region 11f, from the interface of the positive electrode active material layer contacting with the positive electrode current collector to the 15% of the total thickness d of the positive electrode active material layer.

In the equation for the positive electrode QBR, $CB_s$ is the average fluorine content in the positive electrode active material layer surface region 11s, and $CB_f$ is the average fluorine content in the positive electrode active material layer floor region 11f.

The positive electrode QBR may be calculated as follows.

First, after selecting a positive electrode for investigating the positive electrode QBR, a cross-section of the selected positive electrode is prepared by argon (Ar) ion milling. Then, the components in a positive electrode active material layer of the prepared cross-section of the positive electrode is subjected to EDS mapping using an energy-dispersive X-ray spectroscopy (EDS) detector of a scanning electron microscope (SEM).

After extracting a line profile in the thickness direction of the positive electrode layer from the EDS mapping result and extracting the average fluorine content ($B_s$) of the fluorine-containing positive electrode binder of the positive electrode layer surface region and the average fluorine content ($B_f$) of the fluorine-containing positive electrode binder of the positive electrode layer floor region from the extracted line profile, positive electrode QBR is calculated using the following equation.

$$\text{Positive electrode } QBR = CB_s/CB_f$$

The positive electrode active material layer surface region is a region from the outermost surface of the positive electrode active material layer to 15% of the total thickness of the positive electrode active material layer, and the positive electrode active material layer floor region is a region from the interface of the positive electrode active material layer contacting with the positive electrode current collector to the 15% of the total thickness of the positive electrode active material layer.

Figure 2:
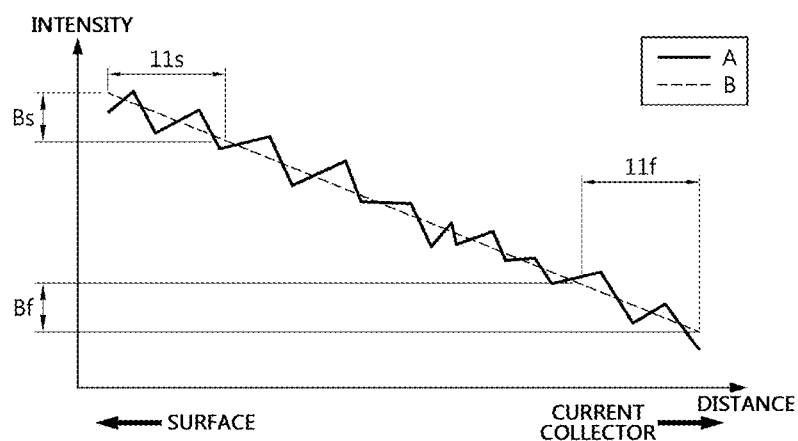
FIG. 2 schematically illustrates the calculation of the QBR of an electrode layer.

FIG. 2 schematically illustrates the calculation of the positive electrode QBR of the positive electrode active material layer. Referring to FIG. 2, the X-axis represents the thickness of the positive electrode active material layer, i.e., the distance from the surface to the current collector, and the Y-axis represents the intensity of the fluorine component. The line A indicates the intensity of the fluorine component of the fluorine-containing binder in the positive electrode active material layer extracted from the EDS mapping, and the line B is a trend line of the line A determined by LOWESS (locally weighted scatterplot smoothing).

The positive electrode QBR is the ratio of the content of the fluorine-containing positive electrode binder in the surface region to the content of the fluorine-containing positive electrode binder in the floor region of the positive electrode active material layer, and is a measure of the uniformity of the fluorine-containing positive electrode binder distributed in the positive electrode active material layer along the thickness direction. The content of the fluorine-containing positive electrode binder can be inferred from the fluorine component contained in the fluorine-containing positive electrode binder.

The positive electrode QBR may be 1.1 or lower. In an exemplary embodiment of the present disclosure, the QBR may be 0.95 or higher or 0.97 or higher, and 1.03 or lower or 1.05 or lower, or 0.95-1.05.

When the positive electrode QBR is 1.1 or lower, the content of the fluorine-containing positive electrode binder in the surface region is not greater than the content of the fluorine-containing positive electrode binder in the floor region of the positive electrode active material layer because the fluorine-containing positive electrode binder dose not migrate toward the positive electrode surface, and the distribution of the binder along the thickness direction of the positive electrode active material layer becomes uniform. As a result, the adhesion between the current collector and the positive electrode active material layer is improved, and the conductivity on the surface of the positive electrode active material layer and the charge/discharge rate may also be increased.

In an exemplary embodiment of the present disclosure, the positive electrode may be prepared by a method including:

a step of preparing a mixture including a positive electrode active material, a conductive material and a binder;

a step of preparing a mixture lump by kneading the mixture at 70-200° C. under normal pressure or higher pressure;

a step of obtaining a mixture powder for a positive electrode by grinding the mixture lump;

a step of forming a film for a positive electrode by calendering the mixture powder for a positive electrode between a plurality of rolls; and a step of laminating the film for a positive electrode on a metal current collector.

Hereinafter, the method for preparing the positive electrode according to the present disclosure will be described in more detail.

First, a mixture including a positive electrode active material, a positive electrode conductive material and a positive electrode binder is prepared.

The mixing for preparing the mixture is not limited as long as the positive electrode active material, the positive electrode conductive material and the positive electrode binder can be mixed in the form of a powder for uniform distribution, and may be performed by various methods. But, since the positive electrode of the present disclosure is prepared by a dry method not using a dispersion medium, the mixing may be performed by dry mixing using a device such as a blender.

The mixing may be performed at 5,000-20,000 rpm for 30 seconds to 2 minutes, specifically at 10,000-15,000 rpm for 30 seconds to 1 minute, in order to ensure uniformity.

The positive electrode binder is not specially limited as long as microfiberization is possible in the step of preparing the mixture powder. More specifically, the binder may be a fluorine-containing binder to achieve the QBR described above. The microfiberization refers to finely dividing a polymer and may be performed using, for example, mechanical shear force. As a specific example, a fluorine-containing polymer may be used as the positive electrode binder as described above. Specifically, polytetrafluoroethylene (PTFE) may be used alone or one or more PVDF-based copolymer such as PVDF (polyvinylidene fluoride), PVDF-HFP (polyvinylidene fluoride-co-hexafluoropropylene), etc. may be further used in addition to the polytetrafluoroethylene.

Next, a mixture lump is prepared by kneading the mixture at 70-200° C. under normal pressure or higher pressure.

In the conventional technology, high-shear mixing such as jet milling has been performed to fiberize the positive electrode binder. But, because the mixing can cause problems such as the pulverization of active materials and cutting of the formed fibers, low-shear kneading is used in the present disclosure rather than the high-shear mixing to solve such problems.

The kneading method is not specially limited. In a specific exemplary embodiment of the present disclosure, the kneading may be performed, for example, using a kneader.

The kneading is a step in which a mixture lump with a solid content of 100% is formed as the positive electrode binder is fiberized and combines or connects the positive electrode active material and positive electrode conductive material powders.

Specifically, the kneading may be controlled at a speed of 10-100 rpm. For example, the kneading may be controlled in a speed range of 20 rpm or higher and 70 rpm or lower. The kneading may be performed for 1-30 minutes. For example, the kneading may be performed at a speed of 40-70 rpm for 3-10 minutes. Meanwhile, the kneading may be controlled within a shear rate of 10-500/s. In a specific exemplary embodiment of the present disclosure, the kneading may be performed for 1-30 minutes and the shear rate may be controlled at 30-100/s.

In addition, the kneading step may be performed at high temperature and under normal pressure or higher pressure, more specifically above normal pressure.

More specifically, the kneading may be performed at 70-200° C., specifically at 90° C.-150° C.

If the kneading temperature is below the lower limit, a film may not be formed easily during the calendering because the positive electrode binder is not fiberized easily and a lump is not formed easily during the kneading. And, if the kneading temperature is above the upper limit, the positive electrode binder may be fiberized rapidly and the formed fibers may be cut due to excessive shear force.

The kneading may be performed under normal pressure or higher pressure, specifically at 1-100 atm, more specifically at 10-80 atm. When the above pressure range is satisfied, the problem of cutting of fibers due to excessive shear force and pressure or excessively increased density of the mixture lump may be prevented. That is to say, the effect intended by the present disclosure may be achieved by performing the low-shear mixing process at high temperature and under normal pressure or higher pressure, instead of high-shear mixing.

Then, a mixture powder for a positive electrode is obtained by grinding the mixture lump.

Specifically, the mixture lump prepared through the kneading may be calendared immediately, but it may be necessary to prepare the mixture lump into a thin film. In this case, the film density may increase excessively or it may be difficult to obtain a uniform film. Therefore, in the present disclosure, the prepared mixture lump passes through the grinding step.

The grinding step may be performed using a device such as a blender, a grinder, etc., although not being limited thereto, and the grinding step may be performed specifically at 5,000-20,000 rpm for 30 seconds to 10 minutes, more specifically at 10,000-18,000 rpm for 30 seconds to 2 minutes.

When the above grinding speed and time are satisfied, a powder of appropriate size for filming may be formed due to sufficient grinding and the problem of the formation of many fine particles in the mixture lump can be prevented. If necessary, a classification process may be performed to filter out powders of sizes outside a certain range.

Next, a film for a positive electrode is formed by calendering the mixture powder for a positive electrode between a plurality of rolls.

Figure 3:
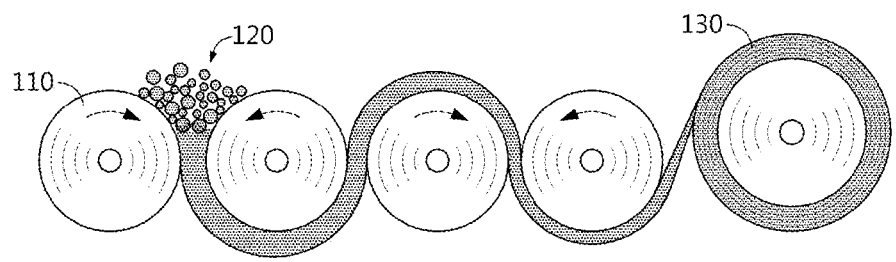
FIG. 3 schematically shows a manufacturing process of a film for a positive electrode according to an exemplary embodiment of the present disclosure.
Figure 4:
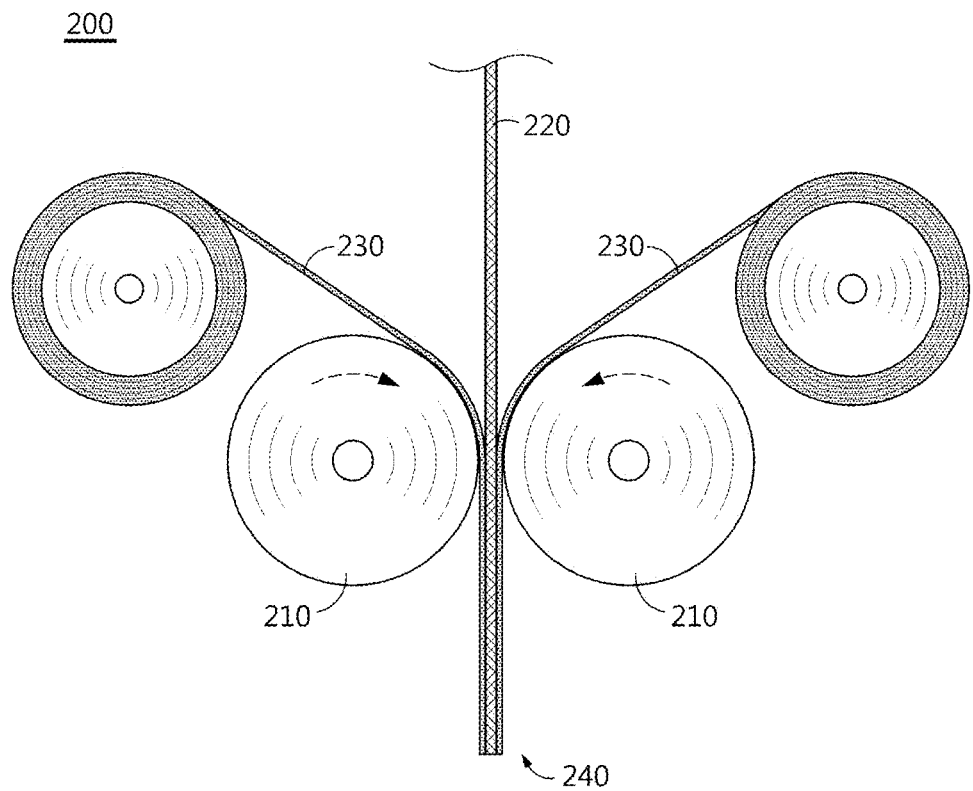
FIG. 4 schematically shows a lamination process of an electrode according to an exemplary embodiment of the present disclosure.

Referring to FIG. 3, in the step 100 of forming the film for a positive electrode, a plurality of rolls 110 are arranged spaced apart. The mixture powder 120 for an electrode prepared in the previous step is input between the adjacent rolls 110 and the rolls 110 are rotated in opposite direction, so that the mixture powder 120 is rolled and formed into a sheet or a film through powder sheeting. Then, a film for a positive electrode having a desired thickness can be obtained finally through repeated calendering.

Specifically, through the calendering, the mixture powder for a positive electrode may be processed into a film having, for example, an average thickness of 50-300 μm.

The calendering may be performed by rolls that are opposite to each other. The roll temperature may be controlled at 50-200° C. and the roll speed ratio may be controlled in a range of 1.0-2.0.

Through the calendering, a dry positive electrode film that serves as a positive electrode mixture may be prepared. The positive electrode film is conventionally also called a free-standing film.

Since the positive electrode film prepared in this way does not contain a solvent, it has little fluidity and, thus, is easy to handle and can be prepared into positive electrodes of various desired shapes through processing. In addition, if the dry positive electrode film according to an exemplary embodiment of the present disclosure is used for preparation of a positive electrode, the manufacturing processability of the positive electrode may be improved greatly because the drying process for removing the solvent can be omitted. Furthermore, the problems of the existing method for preparing a dry positive electrode, such as the breakage of the active material, the cutting of the fiberized binder, etc. can be solved.

In another exemplary embodiment of the present disclosure, there is provided an apparatus for preparing a dry electrode, which includes: a blender for mixing raw materials including an active material, a conductive material and a fluorine-containing binder; a kneader for preparing a mixture lump by kneading the mixture; a grinder for forming a mixture powder for an electrode by grinding the mixture lump; a calendar for forming the mixture powder for an electrode into a dry electrode film; and a lamination roller for laminating the dry electrode film on at least one side of a current collector.

The blender is a mixer for mixing raw materials. It may mix the raw materials at a speed of 5,000-20,000 rpm as described above. The kneader is a device for fiberizing the fluorine-containing binder and dispersing the raw materials of the mixture, and the mixture may be prepared into a mixture lump through kneading in the kneader. In order to achieve the purpose of the present disclosure, the kneader may be set to 70-200° C. and normal pressure or higher pressure. Specifically, it may be set to 90-180° C. and 1-100 atm, more specifically to 10-80 atm.

The grinder is a device for forming a mixture powder for an electrode by grinding the mixture lump. A blender, a grinder, etc. may be used for the purpose.

The calendar is a device for forming the mixture powder for an electrode into a film. For example, it may be a pair of rollers facing each other, and film thickness may be controlled with the spacing between them.

The lamination roller serves to attach the dry electrode film formed by the calendar to at least one side of a current collector.

The porosity of the dry electrode film according to the present disclosure may be determined by the calendar and the lamination roller.

That is to say, the device for preparing a dry electrode according to the present disclosure is characterized in that it includes a kneader and a grinder.

Since the specific structures, etc. of the blender, the kneader, the calendar and the lamination roller are well known, detailed descriptions thereof will be omitted in the present specification.

Next, the negative electrode included in the secondary battery according to an exemplary embodiment of the present disclosure will be described in detail.

The negative electrode include a negative electrode current collector and a negative electrode active material layer located on the negative electrode current collector and including a plurality of granules comprising a negative electrode active material, and a negative electrode binder, and formed as the negative electrode binder binds the negative electrode active material.

Hereinafter, the granules for the electrode of the present disclosure are described in detail.

The granules included in the negative electrode include a negative electrode active material and a negative electrode binder. The granule may be a composite particle including the negative electrode active material and the negative electrode binder. In addition, as will be described later, the granule may further contain any component added as necessary, such as a negative electrode conductive material. For example, the granule may be a composite particle including a negative electrode active material, a negative electrode conductive material and a negative electrode binder.

In an exemplary embodiment of the present disclosure, the granule may be a secondary particle formed as two or more negative electrode active material particles assemble as they are bound by the negative electrode binder. In the present disclosure, the negative electrode active material may refer to a collection of particles, wherein the diameter of each particle of the negative electrode active material may be 0.05-2 μm. In an exemplary embodiment of the present disclosure, the amount of the negative electrode active material may be 80 wt % or more or 90 wt % or more, and the amount of the negative electrode binder may be 20 wt % or less or 10 wt % or less, based on the total weight of the granule. In an exemplary embodiment of the present disclosure, the granule may further include an electrode conductive material if necessary. The electrode conductive material may be included in an amount of 0.1-20 wt %, specifically 0.1-10 wt %, based on 100 wt % of the granule. For example, the conductive material may be included in the granule in an amount of about 0.1-5 wt %.

In an exemplary embodiment of the present disclosure, the content of the negative electrode active material in the granule may be 85-98 wt %. The content of the negative electrode binder may be 0.5-10 wt % and the content of the negative electrode conductive material may be 0.5-5 wt %. In another exemplary embodiment, the content of the negative electrode active material may be 90-98 wt %, the content of the negative electrode binder may be 0.5-5 wt % and the content of the negative electrode conductive material may be 0.5-5 wt %.

Figure 5:
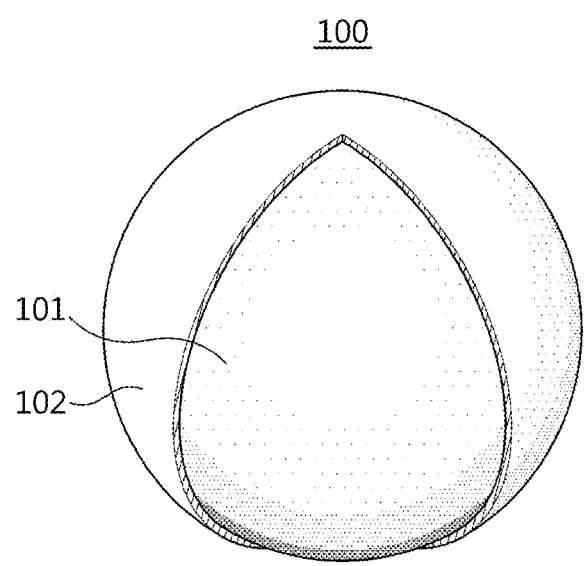
FIG. 5 schematically shows a surface part and a core part of a granule according to an exemplary embodiment of the present disclosure.

FIG. 5 schematically shows a surface part and a core part of the granule according to an exemplary embodiment of the present disclosure.

Referring to FIG. 5, the amount of the negative electrode binder included in the surface part 102 of the granule 100 is more than the amount of the electrode binder included in the core part 101 of the granule. The amount of the negative electrode binder may refer to weight or volume.

Together with or independently of this, the granule 100 has a higher content (wt %) of the negative electrode binder included in the surface part 102 of the granule ($B_s/G_t$) than the content (wt %) of the negative electrode binder included in the core part 101 of the granule ($B_c/G_t$), based on 100 wt % of the granule. Here, $B_c$ indicates the weight of the binder included in the core part, $B_s$ indicates the weight of the binder included in the surface part, and $G_t$ indicates the total weight of granule particles.

Together with or independently of this, the granule 100 has a higher content (vol %) of the negative electrode binder included in the surface part 102 of the granule ($B_s/G_t$) than the content (vol %) of the negative electrode binder included in the core part 101 of the granule ($B_c/G_t$), based on 100 vol % of the granule. Here, $B_c$ indicates the volume of the negative electrode binder included in the core part, $B_s$ indicates the volume of the negative electrode binder included in the surface part, and $G_t$ indicates the total volume of granule particles.

Here, the surface part may mean a region near the surface of the granule from the granule surface to a predetermined depth toward the center of the granule, and the core part may mean a region other than the surface part. In an exemplary embodiment of the present disclosure, the surface part may mean a region from the 70% of the radius from the center of the granule to the granule surface. For example, in an exemplary embodiment of the present disclosure, the surface part may mean a region from the 80%, 85%, 90% or 95% of the radius to the granule surface.

In an exemplary embodiment of the present disclosure, the center of the granule may refer to a location corresponding to ½ of the longest diameter of the granule.

In an exemplary embodiment of the present disclosure, the content of the electrode binder in the region from the 90% of the radius from the center of the granule particle to the granule surface may be 50 wt % or more, 60 wt % or more, 70 wt % or more, 80 wt % or more or 90 wt % or more based on 100 wt % of the granule.

In another exemplary embodiment of the present disclosure, the content of the electrode binder in the region from the 95% of the radius from the center of the granule particle to the granule surface may be 50 wt % or more, 60 wt % or more, 70 wt % or more, 80 wt % or more or 90 wt % or more based on 100 wt % of the granule.

In another exemplary embodiment of the present disclosure, the content of the negative electrode binder in the region from the 99% of the radius from the center of the granule particle to the granule surface may be 50 wt % or more, 60 wt % or more, 70 wt % or more, 80 wt % or more or 90 wt % or more based on 100 wt % of the granule.

In an exemplary embodiment of the present disclosure, the content of the negative electrode binder in the region from the 90% of the radius from the center of the granule particle to the granule surface may be 50 vol % or more, 60 vol % or more, 70 vol % or more, 80 vol % or more or 90 vol % or more based on 100 vol % of the granule.

In another exemplary embodiment of the present disclosure, the content of the negative electrode binder in the region from the 95% of the radius from the center of the granule particle to the granule surface may be 50 vol % or more, 60 vol % or more, 70 vol % or more, 80 vol % or more or 90 vol % or more based on 100 vol % of the granule.

In another exemplary embodiment of the present disclosure, the content of the negative electrode binder in the region from the 99% of the radius from the center of the granule particle to the granule surface may be 50 vol % or more, 60 vol % or more, 70 vol % or more, 80 vol % or more or 90 vol % or more based on 100 vol % of the granule.

More specifically, the granule may include: a core part including a plurality of negative electrode active materials; and a surface part including a negative electrode binder located wholly or partially outside the core part and binding the electrode active materials. That is to say, in the core part of the granule, the plurality of negative electrode active materials may form an aggregate through one or more of surface contact, line contact and point contact, and, in the surface part of the granule, the negative electrode binder may be located wholly or partially outside the aggregate and fix and bind the plurality of negative electrode active materials in the core part of the granule.

In an exemplary embodiment of the present disclosure, a small amount of the negative electrode binder may be also included in the core part of the granule and may serve to connect and fix the plurality of negative electrode active materials of the core part. However, as described earlier, it is preferred that the content of the negative electrode binder is larger in the surface part than in the core part.

In an exemplary embodiment of the present disclosure, the granule may have an aspect ratio of 0.5-1.0, specifically 0.75-1.0. The aspect ratio may mean the ratio of the major axis length to the minor axis length of the granule. In another exemplary embodiment of the present disclosure, the granules may have an average aspect ratio of 0.5-1.0, specifically 0.75-1.0, where the average aspect ratio may mean the ratio of the average major axis length to the average minor axis length of the granule particles. Here, the average minor axis length may refer to the average length in the axial direction of the granule having the shortest length, and the average major axis length may refer to the average length in the axial direction of the granule having the longest length. When the aspect ratio of the granule satisfies the above ranges, fluidity suitable for the process can be achieved.

In an exemplary embodiment of the present disclosure, the granule may have a particle diameter particle of 0.1-1,000 μm based on the longest diameter. In another exemplary embodiment of the present disclosure, the granule may have an average particle diameter ($D_{50}$) of 0.1-1,000 μm.

In an exemplary embodiment of the present disclosure, the negative electrode active material layer may include a negative electrode active material and a negative electrode binder having a double bond, the negative electrode active material layer may have a negative electrode QBR (quantified binder ratio) of 2.0 or lower, and the negative electrode QBR may be defined by the following equation (Of course, as described above, the negative electrode active material layer may include a negative electrode active material, a negative electrode conductive material and a negative electrode binder having a double bond):

$$\text{Negative electrode } QBR = AB_s/AB_f$$

wherein ABs is the average double bond content of the negative electrode binder in the surface region of the negative electrode active material layer from the outermost surface of the negative electrode active material layer to 15% of the total thickness of the negative electrode active material layer, and ABf is the average double bond content of the negative electrode binder in the floor region of the negative electrode active material layer from the interface of the negative electrode active material layer contacting with the negative electrode current collector to the 15% of the total thickness of the negative electrode active material layer.

The negative electrode QBR may be 2.0 or lower, 0.6-2.0, 0.9-2.0, 0.6-1.4, 0.6-1.4, 0.9-1.4 or 0.9-1.1. When the negative electrode QBR satisfies the above ranges, the content of the negative electrode binder included in the surface region is not greater than the content of the negative electrode binder included in the floor region of the negative electrode active material layer because the binder does not migrate toward the negative electrode surface, and the distribution of the binder along the thickness direction of the negative electrode active material layer becomes uniform. As a result, the adhesion between the current collector and the negative electrode active material layer is improved, and the conductivity on the surface of the negative electrode active material layer and the charge/discharge rate may also be increased.

As the negative electrode active material, a carbon material such as hard carbon, graphite carbon, etc.; a metal composite oxide such as $Li_xFe_2O_3$ (0≤x≤1), $Li_xWO_2$ (0≤x≤1), $Sn_xMe_{1-x}Me'_yO_z$ (Me:Mn, Fe, Pb or Ge; Me': group 1, 2 or 3 element such as Al, B, P or Si or halogen; 0≤x≤1; 1≤y≤3; 1≤z≤8), etc.; lithium metal; a lithium alloy; a silicon alloy; a tin alloy; a silicon oxide such as SiO, SiO/C, $SiO_2$, etc.; SnO, $SnO_2$, a metal oxide such as PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; a Li—Co—Ni-based material, etc. may be used.

The negative electrode binder may include one or more of a diene-based polymer, an acrylate-based polymer or a styrene-based polymer.

For example, the diene-based polymer may be a polymer containing a monomer unit derived from a conjugated diene, such as butadiene, isoprene, etc. or a hydrogenated polymer thereof. The proportion of the conjugated diene-derived monomer in the diene-based polymer may be usually 40 wt % or more, specifically 50 wt % or more, more specifically 60 wt % or more. Specific examples may include: conjugated diene homopolymer such as polybutadiene, polyisoprene, etc.; aromatic vinyl-conjugated diene copolymers such that may be carboxy-modified, such as styrene-butadiene copolymer (SBR), etc.; cyanated vinyl-conjugated diene copolymers such as acrylonitrile-butadiene copolymer (NBR), etc.; hydrogenated SBR, hydrogenated NBR, etc.

Examples of the acrylate-based polymer may include a polymer containing a monomer unit derived from acrylic ester and/or methacrylic ester. In the acrylate-based polymer, the proportion of the monomer unit derived from acrylic ester and/or methacrylic ester may be usually 40 wt % or more, specifically 50 wt % or more, more specifically 60 wt % or more. Specific examples of the acrylate-based polymer may include a crosslinked acrylate-based polymer such as an acrylic acid 2-ethylhexyl-methacrylic acid-acrylonitrile-ethylene glycol dimethacrylate copolymer, an acrylic acid 2-ethylhexyl-methacrylic acid-methacrylonitrile-diethylene glycol dimethacrylate copolymer, an acrylic acid 2-ethylhexyl-styrene-methacrylic acid-ethylene glycol dimethacrylate copolymer, a butyl acrylate-acrylonitrile-diethylene glycol dimethacrylate copolymer and a butyl acrylate-acrylic acid-trimethylolpropane trimethacrylate copolymer, etc.; an ethylene-(meth)acrylic ester copolymer such as an ethylene-methyl acrylate copolymer, an ethylene-methyl methacrylate copolymer, an ethylene-ethyl acrylate copolymer, an ethylene-ethyl methacrylate copolymer, etc.; a graft polymer obtained by grafting a radical-polymerizable monomer to the ethylene-(meth)acrylic ester copolymer; etc. The radical-polymerizable monomer used in the graft polymer may be, for example, methyl methacrylate, acrylonitrile, methacrylic acid, etc. In addition, an ethylene-(meth)acrylic acid copolymer such as an ethylene-acrylic acid copolymer, an ethylene-methacrylic acid copolymer, etc. may be used as a dispersion-type binder.

The styrene-based polymer may be a polymer having a styrene monomer-derived repeat unit, such as a styrene homopolymer (polystyrene), a styrene copolymer, etc. Examples of the styrene copolymer may include a styrene-ethylene-butadiene copolymer, a styrene-butadiene-propylene copolymer, a styrene-isoprene copolymer, a styrene-n-butyl acrylate-itaconic acid-methyl methacrylate-acrylonitrile copolymer, a styrene-n-butyl acrylate-itaconic acid-methyl methacrylate-acrylonitrile copolymer, a styrene-butadiene block copolymer, a styrene-butadiene-styrene block copolymer, a styrene-ethylene-butylene-styrene block copolymer, a styrene-isoprene block copolymer, a styrene-ethylene-propylene-styrene block copolymer, etc.

Among these, a diene-based polymer and a crosslinked acrylate-based polymer are preferred, and a crosslinked is acrylate-based polymer particularly preferred in that an active material layer with superior binding property to a current collector and superior surface smoothness may be obtained and an electrode for an electrochemical device with high capacitance and low internal resistance can be prepared.

The form of the negative electrode binder is not specially limited. But, a particle form is preferred in terms of binding property and prevention of deterioration caused by decreased capacitance of the electrode or repeated charging and discharging. Examples of the negative electrode binder in particle form include a dispersible binder particle such as latex dispersed in a solvent such as water, etc., or a powder obtained by drying the dispersion.

The negative electrode conductive material is not specially limited as long as it has conductivity without causing chemical change in the battery. For example, graphite such as natural graphite, artificial graphite, etc.; carbon black such as acetylene black, ketjen black, channel black, furnace black, lamp black, thermal black, etc.; a conductive fiber such as a carbon fiber, a metallic fiber, etc.; fluorinated carbon; a metal powder such as aluminum, nickel powder, etc.; a conductive whisker such as zinc oxide, potassium titanate, etc.; a conductive metal oxide such as titanium oxide, etc.; a conductive material such a polyphenylene derivative, etc. may be used. Specifically, for uniform mixing and improved conductivity of the conductive material, one or more selected from a group consisting of activated carbon, graphite, carbon black and carbon nanotube, more specifically activated carbon, may be used.

In an exemplary embodiment of the present disclosure, the content of the negative electrode active material may be 85-98 parts by weight, and the content of the negative electrode binder may be 0.5-10 parts by weight. Specifically, the content of the negative electrode active material may be 90-98 parts by weight, and the content of the negative electrode binder may be 0.5-5 parts by weight.

In an exemplary embodiment of the present disclosure, the content of the negative electrode active material may be 85-98 parts by weight, the content of the negative electrode conductive material may be 0.5-5 parts by weight, and the content of the negative electrode binder may be 0.5-10 parts by weight. Specifically, the content of the negative electrode active material may be 90-98 parts by weight, the content of the negative electrode conductive material may be 0.5-5 parts by weight, and the content of the negative electrode binder may be 0.5-5 parts by weight.

If necessary, a filler which suppresses the expansion of the negative electrode may be additionally added to the negative electrode active material layer. The filler is not specially limited as long as it is a fibrous material and does not cause chemical change in the battery. For example, a fibrous material such as an olefin-based polymer, e.g., polyethylene, polypropylene, etc., a glass fiber, a carbon fiber, etc. may be used.

The negative electrode current collector is not specially limited as long as it has high conductivity without causing chemical change in the battery. For example, stainless steel, aluminum, nickel, titanium, calcined carbon, copper or aluminum, or stainless steel surface-treated with carbon, nickel, titanium, silver, etc. may be used. In addition, fine irregularities may be formed on the surface of the current collector to increase the adhesivity of the positive electrode active material. In addition, it may be in various forms such as a film, a sheet, a foil, a net, a porous material, a foam, a nonwoven, etc.

A primer layer may be formed wholly or partly on the surface of at least one side of the negative electrode current collector.

The primer layer may include a binder and a conductive material, and the sum of the contents of the binder and the conductive material in the primer layer may be 90 wt % or more.

The negative electrode according to an exemplary embodiment of the present disclosure includes a negative electrode active material layer including granules. The primer layer including a binder and a conductive material, wherein the sum of the contents of the binder and the conductive material is 90 wt % or more, ensures the stability of the primer layer over time and superior characteristics such as adhesivity, lifespan characteristics, etc., although the present disclosure is not limited thereto.

First, the primer layer will be described in detail.

In an exemplary embodiment of the present disclosure, the sum of the contents of the binder and the conductive material in the primer layer may be specifically 91 wt % or more, 92 wt % or more, 93 wt % or more, 94 wt % or more, 95 wt % or more, 96 wt % or more, 97 wt % or more, 98 wt % or more or 99 wt % or more, and 100 wt % or less, 99 wt % or less, 98 wt % or less, 95 wt % or less or 93 wt % or less.

In an exemplary embodiment of the present disclosure, the primer layer may include a binder and a conductive material and may further include a dispersant.

In another exemplary embodiment of the present disclosure, the primer layer may include a binder and a conductive material but may not substantially include a dispersant.

In the present specification, the expression 'not substantially include' means that the corresponding component is not included at all or it is included in too small an amount to exhibit its function. For example, the content of a component that is 'not substantially included may be 6 wt % or less, 5 wt % or less, 4 wt % or less, 3 wt % or less, 2 wt % or less, 1 wt % or less, 0.5 wt % or less or 0 wt % (i.e., none at all).

Therefore, the primer layer 'not substantially including a dispersant' may include no dispersant at all in the primer layer or may include the dispersant in too small an amount to exhibit the function of the dispersant, i.e., the dispersion of the binder and the conductive material. For example, the content of the dispersant in the primer layer may be 6 wt % or less, 5 wt % or less, 4 wt % or less, 3 wt % or less, 2 wt % or less, 1 wt % or less, 0.5 wt % or less or 0 wt % (i.e., none at all).

In an exemplary embodiment of the present disclosure, the dispersant which is not substantially included may be decomposed when exposed to the atmosphere and cause the change of the primer layer over time.

The dispersant may include one or more of a cellulose-based polymer and an emulsifiable surfactant, although not being limited thereto.

The cellulose-based polymer may be, for example carboxymethyl cellulose (CMC), an alkali metal salt of carboxymethyl cellulose, hydroxymethyl cellulose (HMC), an alkali metal salt of hydroxymethyl cellulose, hydroxyethyl cellulose (HEC), an alkali metal salt of hydroxyethyl cellulose, hydroxypropyl cellulose (HPC), an alkali metal salt of hydroxypropyl cellulose, ethylhydroxyethyl cellulose (EHEC), methylhydroxymethyl cellulose (MHMC), methylhydroxyethyl cellulose (MHEC), ethylhydroxymethyl cellulose (EHMC), methyl cellulose (MC), ethyl cellulose (EC), hydroxypropylmethyl cellulose (HPMC), hydroxyethylmethyl cellulose (HEMC) or mixtures thereof, although not being limited thereto.

The emulsifiable surfactant may be, for example, a nonionic surfactant, an anionic surfactant, an amphoteric surfactant or mixtures thereof, although not being limited thereto. The nonionic surfactant may be, for example, an ethoxylate, an amide ethoxylate, an amine oxide, an alkyl glucoside or mixtures thereof, although not being limited thereto. The anionic surfactant may be, for example, a phosphate ester, an isethionate, a sulfate, a sulfonate, a taurate or mixtures thereof, although not being limited thereto. The amphoteric surfactant may be a betaine, a glycinate, an alkylamido alkylamine or mixtures thereof, although not being limited thereto.

In another exemplary embodiment of the present disclosure, the primer layer may not substantially include a cellulose-based polymer as a dispersant.

In another exemplary embodiment of the present disclosure, the primer layer may not substantially include carboxymethyl cellulose, hydroxypropylmethyl cellulose or a mixture thereof as a dispersant.

In another exemplary embodiment of the present disclosure, the primer layer may not substantially include an emulsifiable surfactant.

In an exemplary embodiment of the present disclosure, the binder may be any known binder used in a primer layer without special limitation.

In another exemplary embodiment of the present disclosure, the binder may be specifically a binder capable of ensuring the stability of the primer layer over time. Specifically, the binder may have a glass transition temperature ($T_g$) of 45° C. or lower. More specifically, the glass transition temperature of the binder may be from −40° C. to 45° C. For example, the glass transition temperature of the binder may be from −35° C. to 45° C., from −30° C. to 40° C., from −25° C. to 35° C., from−20° C. to 30° C., or from −15° C. to 25° C.

In another exemplary embodiment of the present disclosure, the binder may be, for example, one or more of styrene butadiene rubber (SBR), butadiene rubber (BR), nitrile butadiene rubber (NBR), a styrene-butadiene-styrene block polymer (SBS), a styrene-ethylene-butadiene block polymer (SEB), a styrene-(styrene butadiene)-styrene block polymer, natural rubber (NR), isoprene rubber (IR), an ethylene-propylene-diene terpolymer (EPDM), poly(ethylene-co-propylene-co-5-methylene-2-norbornene), polytetrafluoroethylene (PTFE), polyvinylidene fluoride, polyvinyl chloride, polyvinylidene fluoride-co-hexafluoropropylene, polyvinylidene fluoride-co-trichloroethylene, poly(methyl methacrylate), poly(ethylhexyl acrylate), poly(butyl acrylate), polyacrylonitrile, polyvinylpyrrolidone, polyvinyl acetate, polyethylene, polypropylene, an ethylene-vinyl acetate copolymer (polyethylene-co-vinyl acetate), poly(ethylene oxide), polypropylene oxide, polyacrylate, cyanoethyl pullulan, cyanoethyl polyvinyl alcohol or a mixture thereof. Specifically, the binder may include one or more of styrene butadiene rubber (SBR), nitrile butadiene rubber (NBR), poly(methyl methacrylate), poly(ethylhexyl acrylate) or poly(butyl acrylate).

In another exemplary embodiment of the present disclosure, the binder may be one or more of those described above, which has the glass transition temperature described above.

In another exemplary embodiment of the present disclosure, the binder may be styrene butadiene rubber (SBR) having a glass transition temperature ($T_g$) of −40° C. to 45° C., nitrile butadiene rubber (NBR) having a glass transition temperature ($T_g$) of −40° C. to 45° C., or a mixture thereof.

In an exemplary embodiment of the present disclosure, the conductive material may have a specific surface area of 10-1,400 $m^2/g$. For example, the conductive material may have a specific surface area of 10-400 $m^2/g$ or 30-1,400 $m^2/g$.

In another exemplary embodiment of the present disclosure, the conductive material may have a specific surface area of 30-1,400 $m^2/g$ and may have a spherical shape. For example, a primary particle of the conductive material having a spherical shape may have a size of 10-100 nm, specifically 15-70 nm, although not being limited thereto.

In another exemplary embodiment of the present disclosure, the conductive material may have a tubular shape with a specific surface area of 10-400 $m^2/g$. The conductive material having a tubular shape may have a diameter of a section perpendicular to the length direction of 0.1-3 nm, specifically 0.3-1.5 nm, although not being limited thereto.

The conductive material is not specially limited as long as it has conductivity without causing chemical change in the battery. For example, graphite such as natural graphite, artificial graphite, etc.; carbon black such as acetylene black, ketjen black, channel black, furnace black, lamp black, thermal black, etc.; a conductive fiber such as a carbon fiber, a metallic fiber, etc.; fluorinated carbon; a metal powder such as aluminum, nickel powder, etc.; a conductive whisker such as zinc oxide, potassium titanate, etc.; a conductive metal oxide such as titanium oxide, etc.; a conductive material such a polyphenylene derivative, etc. may be used.

Specifically, for uniform mixing and improved conductivity of the conductive material, one or more selected from a group consisting of activated carbon, graphite, carbon black and carbon nanotube, more specifically activated carbon, may be used.

In an exemplary embodiment of the present disclosure, the primer layer may have the composition described above, and may have a thickness of 300 nm to 1.5 μm, specifically 700 nm to 1.3 μm, although not being limited thereto.

In an exemplary embodiment of the present disclosure, the negative electrode may be a dry electrode prepared by a method including:
- a step of preparing a slurry by mixing a negative electrode active material and a negative electrode binder with a dispersion medium;
- a step of preparing an initial granule by spray-drying the slurry;
- a step of coating the initial granule on a current collector; and
- a step of forming a negative electrode active material layer including a rolled granule by rolling the coated initial granule.

The granule included in the negative electrode active material layer may be a rolling product of the initial granule prepared by a method including: a step of preparing a slurry by mixing a negative electrode active material and a negative electrode binder with a dispersion medium; and a step of spray-drying the slurry, and may be referred to as a rolled granule.

In an exemplary embodiment of the present disclosure, the slurry may further include a negative electrode conductive material.

First, a slurry wherein a negative electrode active material, a negative electrode binder, a negative electrode conductive material as an optional component and other additives are dispersed or dissolved is prepared by dispersing or dissolving a negative electrode active material, a negative electrode binder, a negative electrode conductive material as an optional component and other additives in a dispersion medium (a solvent for the negative electrode binder).

The dispersion medium used to obtain the slurry may be most specifically water, but an organic solvent may also be used. The organic solvent may be, for example, an alkyl alcohol such as methyl alcohol, ethyl alcohol, propyl alcohol, etc.; an alkyl ketone such as acetone, methyl ethyl ketone, etc.; an ether such as tetrahydrofuran, dioxane, diglyme, etc.; an amide such as diethylformamide, dimethylacetamide, N-methyl-2-pyrrolidone (hereinafter, also referred to as NMP), dimethylimidazolidinone, etc.; a sulfur-based solvent such as dimethyl sulfoxide, sulfolane, etc.; but an alcohol is preferred. When an organic solvent with a boiling point lower than water is used together, the drying speed can be increased during fluid granulation. In addition, because the dispersibility or solubility of the negative electrode binder can vary, the viscosity or fluidity of the slurry may be adjusted depending on the amount or kind of the dispersion medium to improve production efficiency.

The amount of the dispersion medium used to prepare the slurry may be determined such that the solid content of the slurry is within a range of 1-50 wt %, 5-50 wt % or 10-30 wt %.

The method or order of the dispersion or dissolution of the negative electrode active material and the negative electrode binder in the dispersion medium is not specially limited. For example, the negative electrode active material and the negative electrode binder may be mixed by adding to the dispersion medium or, after dissolving or dispersing the negative electrode binder in the dispersion medium, the negative electrode active material may be added finally and then mixed. As described above, the negative electrode conductive material, other additives, etc. may be optionally added to the dispersion medium.

The mixing may be performed using a mixing device, e.g., a ball mill, a sand mill, a bead mill, a pigment disperser, a stone mill, an ultrasonic disperser, a homogenizer, a planetary mixer, etc. The mixing is performed usually at room temperature to 80° C. for 10 minutes to several hours.

Next, an initial granule is prepared by spray-drying the slurry.

The spray drying is a method of drying by spraying the slurry in hot air. A device used for the spray drying may be of a rotary disk type, a nozzle compression type, etc. The rotating disk type is a method of introducing the slurry almost to the center of a disk rotating at high speed, so that the slurry is placed outside the disk due to the centrifugal force of the disk and then dried in the form of mist. The rotation speed of the disk depends greatly on the size of the disk, but is usually 5,000-35,000 rpm, specifically 15,000-30,000 rpm. Meanwhile, the nozzle compression type is a method of passing the slurry through a thin nozzle while spraying a high-pressure fluid such as air or other liquids in the form of mist.

In an exemplary embodiment of the present disclosure, the temperature of the hot air may be controlled such that the temperature at the inlet of a reactor is 80-250° C. for formation of a granular structure with a high electrode binder content on the surface. In the present disclosure, the temperature of the hot air may be controlled specifically to 175-220° C., more specifically to 180-220° C., in consideration of the content gradient and aspect ratio of the binder. In the spray drying method, the method for inhaling the hot air is not specially limited. For example, a method wherein the hot air and the spray are flown together in the horizontal direction, a method wherein spraying is performed at the top of a drying tower so that the spray and the hot air descend together, a method wherein sprayed droplets and the hot air are contacted by countercurrent contact, a method wherein sprayed droplets and the hot air flow together and then contacted by countercurrent contact after gravitational falling, etc. may be used. Meanwhile, in an exemplary embodiment of the present disclosure, the temperature at the outlet of the reactor (the temperature of the hot air discharged from the reactor) during the spray drying may be controlled to 90-130° C.

If the outlet temperature and/or $\Delta T$, i.e., the difference of the inlet temperature and the outlet temperature, is small, the solvent may remain as the drying is not achieved enough. As a result, uniform spherical particles may not be formed and the granule may be aggregated or become amorphous. Meanwhile, if the inlet temperature is too high and $\Delta T$ is large, particles with very small $D_{50}$ and a low aspect ratio may be formed due to overdrying. Therefore, in order to control the particle size to an appropriate level to achieve high sphericity with less aggregation of the binder, it is necessary to control the inlet temperature and the outlet temperature within appropriate ranges.

In addition, heat treatment may be performed optionally to harden the surface of the spray-dried product, i.e., the granule. The heat treatment may be performed usually at 80-300° C.

In an exemplary embodiment of the present disclosure, the initial granule may have a span of 0.5-1.5 or 0.7-1.3, as defined by the following equation.

$$\text{Span} = (D_{90} - D_{10})/D_{50}$$

In the above equation, $D_{10}$, $D_{50}$ and $D_{90}$ mean the circle-equivalent diameters of the initial granule at 10%, 50% and 90%, respectively, in the cumulative distribution of the number of the initial granule depending on the circle-equivalent diameter. The circle-equivalent diameter (CE diameter) of the initial granule refers to the diameter of a circle having the same area as the 2D image of the initial granule.

The span is an index representing the distribution (particle size distribution) ratio of the circle-equivalent diameter of the initial granule. That is to say, it is a measure of the ratio of the initial granules with different circle-equivalent diameters. The span is larger if the ratio of the initial granules having circle-equivalent diameters larger than the average circle-equivalent diameter and the initial granules having circle-equivalent diameters smaller than the average circle-equivalent diameter is higher than 1. Then span becomes 0 if the circle-equivalent diameter of all the initial granules is the same as the average circle-equivalent diameter. That is to say, the smaller the span, the narrower is the distribution of the circle-equivalent diameter of the initial granule.

The initial granule may have an aspect ratio of 0.5-1.0. The aspect ratio refers to the ratio of the average major axis length to the average minor axis length of the granule.

The average minor axis length means the average length of in the axial direction of the initial granule having the shortest length, and the average major axis length means the average length of in the axial direction of the initial granule having the longest length. When the aspect ratio of the initial granule satisfies the above range, the granule has enough fluidity.

In an exemplary embodiment of the present disclosure, the negative electrode may be prepared by a method including: a step of coating a plurality of granules on a current collector; and forming a negative electrode active material layer by rolling the coated plurality of granules.

The granule prepared by the method described above is coated on a current collector. As described above, a primer layer including a conductive material and a binder may be formed wholly or partially on at least one side of the current collector.

In an exemplary embodiment of the present disclosure, an active material layer may be formed by supplying the prepared plurality of granules to a roll-type compression molding device using a supply device such as a screw feeder, etc. At this time, the negative electrode current collector may be transferred to the compression molding device while the granules are supplied, so that the negative electrode active material layer is laminated directly on the negative electrode current collector. Alternatively, the negative electrode active material layer may be formed by distributing the granules on the negative electrode current collector, adjusting the thickness of the granules evenly with a blade, etc., and then molding with a compression device.

The temperature during the roll compression molding may be usually 0-200° C., specifically higher than the melting point or glass transition temperature of the negative electrode binder, more specifically higher by 20° C. or more than the melting point or glass transition temperature. The molding speed during the roll compression molding may be usually 0.1-20 m/min or 1-10 m/min. In addition, the press line pressure between rolls may be usually 0.2-30 kN/cm or 0.5-10 kN/cm.

In order to eliminate the gap in the thickness of the formed negative electrode and increase the density of the negative electrode active material layer to achieve high capacity, compression may be performed further, if necessary. As the post-compression method, a roll press process is common. In the roll press process, two cylindrical rolls are arranged up and down in parallel with a narrow interval and the electrode is placed therebetween and compressed as the rolls are rotated in opposite directions. The temperature of the rolls may be controlled through heating, cooling, etc.

In another exemplary embodiment of the present disclosure, there are provided a secondary battery in which an electrode assembly including a positive electrode, a negative electrode and a separator are housed in a battery case (cylindrical case, square case, pouch, etc.) together with a lithium-containing nonaqueous electrolytic solution, and an energy storage device including the same as a unit cell.

The separator may be a porous polymer film commonly used as a separator. For example, a porous polymer film prepared from a polyolefin-based polymer such as an ethylene homopolymer, a propylene homopolymer, an ethylene-butene copolymer, an ethylene-hexene copolymer, an ethylene-methacrylate copolymer, etc. may be used alone or in a laminated manner. In addition, an insulating thin film having high ion permeability and mechanical strength may be used. The separator may include a safety-reinforced separator (SRS) wherein a ceramic material is coated thinly on the separator surface. Besides, conventional porous nonwoven fabrics, e.g., nonwoven fabrics prepared from a glass fiber with a high melting point, a polyethylene terephthalate fiber, etc., may be used, although not being limited thereto.

The electrolytic solution includes a lithium salt as an electrolyte and an organic solvent for dissolving the same.

The lithium salt is not specially limited as long as it is one commonly used in the electrolytic solution of a secondary battery. For example, the anion of the lithium salt may be one or more selected from a group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent included in the electrolytic solution may be one commonly used without limitation. Typically, one or more selected from a group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, γ-butyrolactone, propylene sulfite and tetrahydrofuran may be used.

In particular, among the carbonate-based organic solvents, cyclic carbonates such as ethylene carbonate and propylene carbonate may be specifically used since they dissociate the lithium salt in the electrolyte well due to high permittivity as high-viscosity organic solvents. More specifically, a mixture of the cyclic carbonate with a linear low-viscosity, low-permittivity cylclic carbonate, such as dimethyl carbonate and diethyl carbonate, may be used since an electrolytic solution with high electrical conductivity can be obtained.

Optionally, the electrolytic solution according to the present disclosure may further include an additive commonly included in an electrolytic solution, such as an overcharge inhibitor, etc.

The lithium secondary battery according to an exemplary embodiment of the present disclosure may be prepare by forming an electrode assembly by disposing a separator between a positive electrode and a negative electrode, putting the electrode assembly in, for example, a pouch, a cylindrical battery case or a square battery case, and then injecting an electrolyte. Alternatively, after stacking the electrode assembly and impregnating it in an electrolytic solution, a lithium secondary battery may be obtained by sealing in a battery case.

In an exemplary embodiment of the present disclosure, the secondary battery may include the following combinations of a positive electrode and a negative electrode.

A secondary battery according to an exemplary embodiment of the present disclosure may include:
- a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;
- a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and
- a separator disposed between the positive electrode and the negative electrode, wherein
- the positive electrode may have a bending resistance lower than 10 mm Φ,
- the granule included in the negative electrode may have: a core part including the negative electrode active material; and a surface part located wholly or partially outside the core part and including a binder binding the negative electrode active material, and
- the binder included in the surface part of the granule may be connected with the binder in the surface part of the neighboring granule, so that the binder is distributed in the active material layer to have a network structure.

A secondary battery according to an exemplary embodiment of the present disclosure may include:
- a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;
- a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and
- a separator disposed between the positive electrode and the negative electrode, wherein
- the positive electrode binder included in the positive electrode active material layer may have a crystallinity of 10% or lower,
- the granule included in the negative electrode may have: a core part including the negative electrode active material; and a surface part located wholly or partially outside the core part and including a binder binding the negative electrode active material, and
- the binder included in the surface part of the granule may be connected with the binder in the surface part of the neighboring granule, so that the binder is distributed in the active material layer to have a network structure.

A secondary battery according to an exemplary embodiment of the present disclosure may include:
- a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;
- a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and
- a separator disposed between the positive electrode and the negative electrode, wherein
- the positive electrode active material layer may include a positive electrode active material, a positive electrode conductive material and a fluorine-based positive electrode binder,
- the positive electrode active material layer may have a positive electrode QBR (quantified binder ratio) of 1.1 or lower, and
- the positive electrode QBR may be defined by the following equation:

$$\text{Positive electrode } QBR = CB_s/CB_f$$

wherein $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer,
- the granule included in the negative electrode may have: a core part including the negative electrode active material; and a surface part located wholly or partially outside the core part and including a binder binding the negative electrode active material, and
- the binder included in the surface part of the granule may be connected with the binder in the surface part of the neighboring granule, so that the binder is distributed in the active material layer to have a network structure.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode may have a bending resistance lower than 10 mm ψ, and the granule included in the negative electrode may have a higher negative electrode binder content (wt %) in a surface part than in a core part based on 100 wt % of the negative electrode active material and the negative electrode binder, wherein the surface part may mean a region near the surface of the granule from the granule surface to a predetermined depth toward the center of the granule, and the core part may mean a region other than the surface part.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode binder included in the positive electrode active material layer may have a crystallinity of 10% or lower, and the granule included in the negative electrode may have a higher negative electrode binder content (wt %) in a surface part than in a core part based on 100 wt % of the negative electrode active material and the negative electrode binder, wherein the surface part may mean a region near the surface of the granule from the granule surface to a predetermined depth toward the center of the granule, and the core part may mean a region other than the surface part.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode active material layer may include a positive electrode active material, a positive electrode conductive material and a fluorine-based positive electrode binder, the positive electrode active material layer may have a positive electrode QBR (quantified binder ratio) of 1.1 or lower, and the positive electrode QBR may be defined by the following equation:

$$\text{Positive electrode } QBR = CB_s/CB_f$$

wherein $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer, and the granule included in the negative electrode may have a higher negative electrode binder content (wt %) in a surface part than in a core part based on 100 wt % of the negative electrode active material and the negative electrode binder, wherein the surface part may mean a region near the surface of the granule from the granule surface to a predetermined depth toward the center of the granule, and the core part may mean a region other than the surface part.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode may have a bending resistance lower than 10 mm Φ, a primer layer may be formed wholly or partially on at least one side of the current collector, the primer layer may include a binder and a conductive material, and the sum of the contents of the binder and the conductive material may be 90 wt % or more based on the total weight of the primer layer.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode binder included in the positive electrode active material layer may have a crystallinity of 10% or lower, a primer layer may be formed wholly or partially on at least one side of the current collector, the primer layer may include a binder and a conductive material, and the sum of the contents of the binder and the conductive material may be 90 wt % or more based on the total weight of the primer layer.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode active material layer may include a positive electrode active material, a positive electrode conductive material and a fluorine-based positive electrode binder, the positive electrode active material layer may have a positive electrode QBR (quantified binder ratio) of 1.1 or lower, and the positive electrode QBR may be defined by the following equation:

$$\text{Positive electrode } QBR = CB_s/CB_f$$

wherein $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer, a primer layer may be formed wholly or partially on at least one side of the current collector, the primer layer may include a binder and a conductive material, and the sum of the contents of the binder and the conductive material may be 90 wt % or more based on the total weight of the primer layer.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the negative electrode binder may have a double bond, the negative electrode active material layer may have a negative electrode QBR (quantified binder ratio) of 2.0 or lower, and the negative electrode QBR may be defined by the following equation:

$$\text{Negative electrode } QBR = AB_s/AB_f$$

wherein $AB_s$ is the average double bond content of the negative electrode binder in the surface region of the negative electrode active material layer from the outermost surface of the negative electrode active material layer to 15% of the total thickness of the negative electrode active material layer, and $AB_f$ is the average double bond content of the negative electrode binder in the floor region of the negative electrode active material layer from the interface of the negative electrode active material layer contacting with the negative electrode current collector to the 15% of the total thickness of the negative electrode active material layer.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode binder included in the positive electrode active material layer may have a crystallinity of 10% or lower, the negative electrode binder may have a double bond, the negative electrode active material layer may have a negative electrode QBR (quantified binder ratio) of 2.0 or lower, and the negative electrode QBR may be defined by the following equation:

$$\text{Negative electrode } QBR = AB_s/AB_f$$

wherein $AB_s$ is the average double bond content of the negative electrode binder in the surface region of the negative electrode active material layer from the outermost surface of the negative electrode active material layer to 15% of the total thickness of the negative electrode active material layer, and $AB_f$ is the average double bond content of the negative electrode binder in the floor region of the negative electrode active material layer from the interface of the negative electrode active material layer contacting with the negative electrode current collector to the 15% of the total thickness of the negative electrode active material layer.

A secondary battery according to an exemplary embodiment of the present disclosure may include:

a positive electrode including a positive electrode current collector and a positive electrode active material layer located on the positive electrode current collector and including a positive electrode active material, a positive electrode conductive material and a positive electrode binder, wherein the positive electrode binder is fiberized and binds the positive electrode active material and the positive electrode conductive material;

a negative electrode including a negative electrode current collector and a negative electrode active material layer located on the negative electrode current collector and comprising a plurality of granules comprising a negative electrode active material and a negative electrode binder, wherein the plurality of granules are formed as the negative electrode binder binds the negative electrode active material; and a separator disposed between the positive electrode and the negative electrode, wherein the positive electrode active material layer may include a positive electrode active material, a positive electrode conductive material and a fluorine-based positive electrode binder, the positive electrode active material layer may have a positive electrode QBR (quantified binder ratio) of 1.1 or lower, and the positive electrode QBR may be defined by the following equation:

$$\text{Positive electrode } QBR = CB_s/CB_f$$

wherein $CB_s$ is the average fluorine content in the surface region of the positive electrode active material layer from the outermost surface of the positive electrode active material layer to 15% of the total thickness of the positive electrode active material layer, and $CB_f$ is the average fluorine content in the floor region of the positive electrode active material layer from the interface of the positive electrode active material layer contacting with the positive electrode current collector to the 15% of the total thickness of the positive electrode active material layer, the negative electrode binder may have a double bond, the negative electrode active material layer may have a negative electrode QBR (quantified binder ratio) of 2.0 or lower, and the negative electrode QBR may be defined by the following equation:

$$\text{Negative electrode } QBR = AB_s/AB_f$$

wherein $AB_s$ is the average double bond content of the negative electrode binder in the surface region of the negative electrode active material layer from the outermost surface of the negative electrode active material layer to 15% of the total thickness of the negative electrode active material layer, and $AB_f$ is the average double bond content of the negative electrode binder in the floor region of the negative electrode active material layer from the interface of the negative electrode active material layer contacting with the negative electrode current collector to the 15% of the total thickness of the negative electrode active material layer.

Since the specific structures, etc. of the secondary battery and the energy storage device are known well, description thereof will be omitted in the present specification.

MODE FOR DISCLOSURE

Hereinafter, the present disclosure will be described specifically through examples. However, the exemplary embodiments according to the present disclosure can be modified in various other forms and it should not be construed that the scope of the present disclosure is limited by the examples. The examples of the present disclosure are provided to more completely explain the present disclosure to those having ordinary knowledge in the art.

Example 1

Preparation of Positive Electrode (Fiberized Binder)

96 g of lithium nickel cobalt manganese aluminum oxide (NCMA, $Li[Ni_{0.88}Co_{0.07}Mn_{0.04}]Al_{0.01}O_2$) as a positive electrode active material, 1 g of carbon black as a positive electrode conductive material and 3 g of polytetrafluoroethylene (PTFE) as a positive electrode binder were put in a blender and a mixture was prepared by mixing at 10,000 rpm for 1 minute. After stabilizing a kneader at a temperature of 150° C. and putting the mixture in the kneader, a mixture lump was obtained by operating the kneader at a pressure of 50 atm and a speed of 50 rpm for 5 minutes. The mixture lump was put in a blender, ground at 10,000 rpm for 30 seconds, and then classified through a sieve with a pore size of 1 mm to obtain a mixture powder for an electrode. Then, a film for a positive electrode was prepared by putting the prepared mixture powder for an electrode in a lab calendar (roll diameter: 88 mm, roll temperature: 100° C.). Two sheets of the film for a positive electrode were placed on both sides of an aluminum foil (19 μm) coated with a conductive primer layer wherein carbon black and an acryl-based binder were mixed at a weight ratio of 5:6 and a positive electrode was prepared through lamination using a compression roll maintained at 150° C.

In the lamination step, the compression ratio of the film for a positive electrode was 35.6% and the rolling ratio of the film for a positive electrode was 16.4%.

The compression ratio of the film for a positive electrode is defined as the ratio of the thickness at the moment when the film for a positive electrode is compressed during the lamination, and is calculated by Equation 1.

$$\text{Compression ratio (\%)} = T_p/T_1 \times 100 \quad \text{[Equation 1]}$$

In Equation 1,
$T_p$ is the compressed thickness of the film for a positive electrode in the lamination step, and $T_1$ is the thickness of the film for a positive electrode before the lamination step.

And, the rolling ratio of the film for a positive electrode is defined as the ratio of the thickness of the film for a positive electrode after the lamination step to the thickness of the film for a positive electrode before the lamination step, and is calculated by Equation 3.

$$\text{Rolling ratio (\%)} = ((T_1 - T_2)/T_1) \times 100 \quad \text{[Equation 3]}$$

In Equation 3,
$T_1$ is the thickness of the film for a positive electrode before the lamination step, and $T_2$ is the thickness of the film for a positive electrode after the lamination step.

The total thickness of the finally prepared electrode was 175 μm, the thickness of the electrode active material layer was 77 μm, and the porosity of the electrode was 25.1%.

The porosity of the electrode was determined by measuring the apparent density of the electrode active material layer only by subtracting the volume and weight of the current collector from the volume and weight of the electrode and calculating from the following equation using the actual density calculated based on the actual density and composition of each component.

$$\text{Porosity (\%)} = \{1 - (\text{apparent density/actual density})\} \times 100$$

The increase in the apparent density of the film for a positive electrode before and after the lamination with the current collector was 19%.

The increase in the apparent density of the film for a positive electrode before and after the lamination with the current collector was calculated by Equation 4, and the apparent density of the film for a positive electrode before and after the lamination with the current collector was calculated by measuring the weight and thickness of the film for a positive electrode before the lamination, measuring the weight and thickness of the electrode after the lamination, and calculating the weight and thickness of the film with the weight and thickness of the current collector subtracted.

$$\text{Increase in apparent density (\%)} = (D_2 - D_1)/D_1 \times 100 \quad \text{[Equation 4]}$$

In Equation 4,
$D_1$ is the apparent density (g/cm$^3$) of the film for a positive electrode before the lamination step, and $D_2$ is the apparent density (g/cm$^3$) of the film for a positive electrode after the lamination step.

Preparation of Negative Electrode (Powder (Granule))

(1) Preparation of Current Collector Equipped with Primer Layer

A slurry for a primer layer was prepared by mixing 30 parts by weight of carbon black (specific surface area: 30 m$^2$/g, particle size: 70 nm) as a conductive material, 69 parts by weight of styrene-butadiene rubber (SBR) ($T_g$: −15° C.) as a binder and 1 part by weight of carboxymethyl cellulose (CMC) as a dispersant in water as a dispersion medium. The content ratio of the conductive material, the binder and the dispersant in the slurry was the same as that of the conductive material, the binder and the dispersant in the primer layer formed later. The solid content of the slurry for a primer layer was 7 wt %.

The prepared slurry for a primer layer was applied to one surface of a copper current collector (thickness: 10 μm) and dried at 130° C. to form a primer layer on the entire surface of the copper current collector. A primer layer was also formed on the back side of the current collector in the same manner using the same solution.

(2) Preparation of Granule for Negative Electrode Active Material Layer

A slurry with a viscosity of about 1000 cPs was prepared by mixing a mixture of natural graphite with a sphericity of 0.95 and artificial graphite with an average sphericity of 0.9, as a negative electrode active material, carbon black (SuperC65) as a negative electrode conductive material, a carboxymethyl cellulose aqueous solution (Daicel 2200, solid content concentration: 1.5 wt %) as a negative electrode dispersant and a modified styrene-butadiene copolymer (AX-B119) as a negative electrode binder at a weight ratio of 95.6:1.0:1.1:2.3 together with water as a dispersion medium using a homogenizer. The solid content of the slurry was 30 wt %. And, the weight ratio of the natural graphite and the artificial graphite was 1.91:76.5.

The prepared slurry was dried with a spray dryer to obtain an initial granule having a core part including a plurality of negative electrode active materials and a negative electrode conductive material and a surface part located wholly or partially outside the core part and including a binder binding the negative electrode active materials and the negative electrode conductive material. The spray dryer was controlled at a temperature of 180° C. and a rotation speed of 20,000 rpm. A granule 1 was prepared by removing large particles of 150 μm of larger from the initial granule using an industrial sieve. A granule 2 was prepared by separating fine particles smaller than 40 μm using an industrial sieve.

Finally, a granule for a negative electrode (final granule) including fine particles in large quantities was prepared by mixing the granule 2 consisting only of fine particles and the granule 1 with only the large particles removed. The final granule exhibited $D_{10}$ of 32 μm, $D_{50}$ of 58 μm and $D_{90}$ of 74 μm in the particle diameter distribution.

(3) Preparation of Negative Electrode (Powder (Granule))

A negative electrode was prepared by applying the prepared granule to both sides of the current collector equipped with the primer layer using a loading device such that 400 mg of the granule could be uniformly applied per 25 cm$^2$ of the current collector and then forming a negative electrode active material layer by compressing at 60° C. with a pressure of 0.7 ton/cm and a speed of 2 m/min using a sheeting machine, which is a roll-to-roll hot rolling device.

Figure 6:
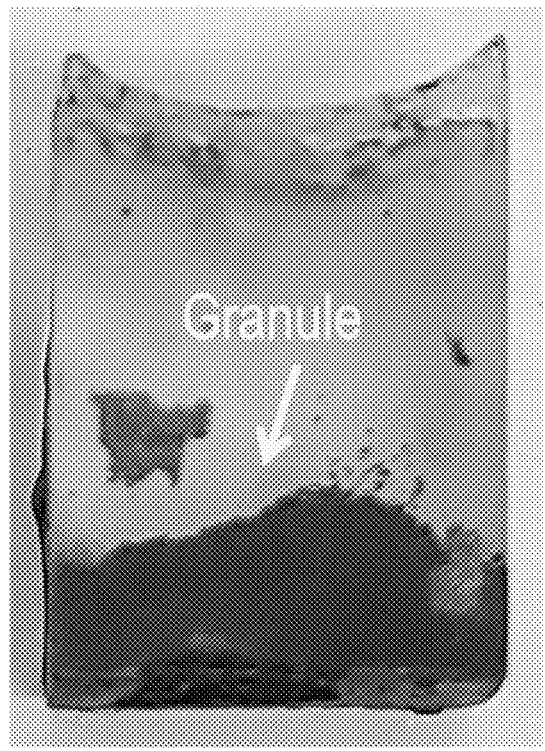
FIG. 6 shows the photographic image of granules fixed in a cured epoxy resin.
Figure 7:
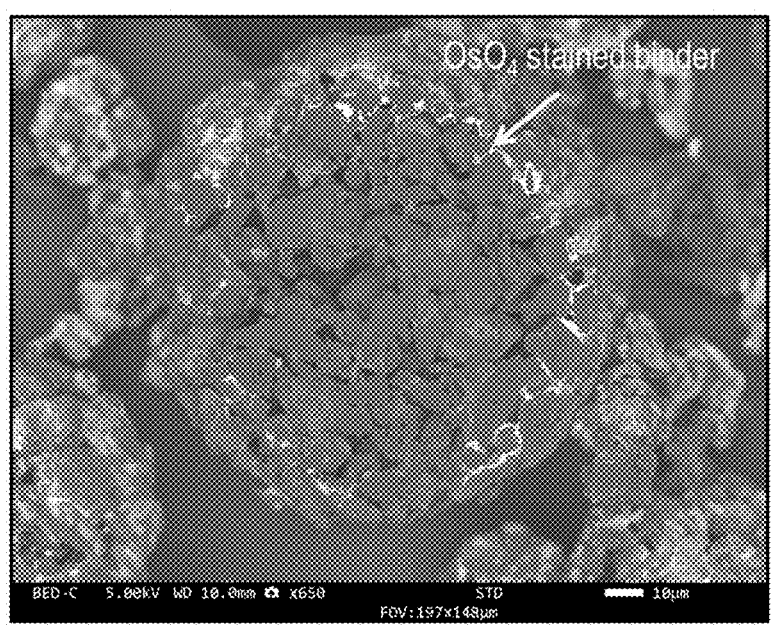
FIG. 7 shows the SEM image of granule particles prepared in Example 1.

The binder in the granule was stained with $OsO_4$. The staining was performed by reacting the granule with an $OsO_4$ crystal or aqueous solution in a glass vial and then evaporating the reagent. Then, the granule was mixed with an epoxy resin and a granule matrix was prepared by fixing in a silicone mold and curing the same (see FIG. 6). Subsequently, a cross-sectional sample was prepared from the granule matrix using an ion milling device (Hitachi IM5000; acceleration voltage: 6 kV). The cross-sectional sample was prepared under the condition of an acceleration voltage of 6 kV and an emission current of 400 μA and the milling time was adjusted so that the mask was not carved completely. The cross section of the prepared sample was observed by SEM (FIG. 7). Referring to FIG. 7, the granule can be divided into a surface part with a higher binder content, from the surface to a predetermined depth toward the center of the granule, and a core part other than the surface part, which surrounds the surface part.

Preparation of Secondary Battery (1) Coin Cell

An electrode assembly was prepared by disposing a porous polyethylene film (thickness: 10 μm) as a separator between the positive electrode and the negative electrode. After housing the electrode assembly in a coin-type battery case, a coin-cell secondary battery was prepared by injecting a liquid electrolyte wherein 1 M $LiPF_6$ was dissolved in a 1:2:1 (volume ratio) solvent mixture of ethylene carbonate, dimethyl carbonate and diethyl carbonate, followed by sealing.

(2) Bi-Cell

An electrode assembly was prepared by preparing two sheets of the positive electrode, one sheet of the negative electrode and a porous polyethylene film (thickness: 10 μm) as a separator and stacking then in the order of positive electrode/separator/negative electrode/separator/positive electrode. After housing the electrode assembly in a pouch-type battery case, a bi-cell secondary battery was prepared by injecting a liquid electrolyte wherein 1 M $LiPF_6$ was dissolved in a 1:2:1 (volume ratio) solvent mixture of ethylene carbonate, dimethyl carbonate and diethyl carbonate, followed by sealing.

(3) Stack Cell

An electrode assembly was prepared by preparing two sheets of the negative electrode, one sheet of the positive electrode and a porous polyethylene film (thickness: 10 μm) as a separator and stacking then in the order of negative electrode/separator/positive electrode/separator/negative electrode. After housing the electrode assembly in a pouch-type battery case, a bi-cell secondary battery wherein a positive electrode is located at the center was prepared by injecting a liquid electrolyte wherein 1 M $LiPF_6$ was dissolved in a 1:2:1 (volume ratio) solvent mixture of ethylene carbonate, dimethyl carbonate and diethyl carbonate, followed by sealing.

An electrode assembly was prepared by preparing two sheets of the positive electrode, one sheet of the negative electrode and a porous polyethylene film (thickness: 10 μm) as a separator and stacking then in the order of positive electrode/separator/negative electrode/separator/positive electrode. After housing the electrode assembly in a pouch-type battery case, a bi-cell secondary battery wherein a negative electrode is located at the center was prepared by injecting a liquid electrolyte wherein 1 M $LiPF_6$ was dissolved in a 1:2:1 (volume ratio) solvent mixture of ethylene carbonate, dimethyl carbonate and diethyl carbonate, followed by sealing.

A stack cell was prepared by stacking four bi-cells wherein the positive electrode is located at the center (positive electrode-type bi-cells) and three bi-cells wherein the negative electrode is located at the center (negative electrode-type bi-cells) with a separator.

Comparative Example 1

Preparation of Positive Electrode (Wet)

A positive electrode active material slurry was prepared by adding $Li[Ni_{0.88}Co_{0.07}Mn_{0.04}]Al_{0.01}O_2$ as a positive electrode active material, a predispersion of carbon black as a positive electrode conductive material and polyvinylidene fluoride (PVDF) as a positive electrode binder to NMP as a dispersion medium at a weight ratio of 96.5:1.5:2 and then stirring with a homogenizer at 3500 rpm for 1 hour. The solid content of the predispersion of carbon black was 16%, and the final solid content of the slurry was 68%. After coating the slurry on both sides of an aluminum current collector with a thickness of 12 μm, a positive electrode active material layer was formed by drying the coated slurry using a dryer equipped with a hot air blower and an IR heater.

Then, a positive electrode equipped with a positive electrode active material layer having a loading amount of 590 mg/25 cm$^2$ was prepared by roll-pressing the positive electrode active material layer.

Preparation of Negative Electrode (Wet)

A slurry with a solid content of 45 wt % was prepared by mixing 19.1 parts by weight of natural graphite with an average sphericity of 0.95 and 76.5 parts by weight of artificial graphite with an average sphericity of 0.9, as negative electrode active materials, 1 part by weight of carbon black (Super-C 65) as a negative electrode conductive material, 2.3 parts by weight of styrene-butadiene rubber (SBR) as a negative electrode binder, 1.1 parts by weight of carboxymethyl cellulose (CMC) as a binder and thickener and water as a dispersion medium.

After coating the slurry on one side of a copper (Cu) thin film as a negative electrode current collector with a thickness of 10 μm, a negative electrode active material layer was formed by drying in an oven at 120° C. for 20 minutes. A negative electrode equipped with a negative electrode active material layer having a loading amount of 400 mg/25 cm² was prepared by roll-pressing the negative electrode active material layer.

Preparation of Secondary Batteries

Coin cell, bi-cell and stack cell secondary batteries were prepared in the same manner as in Example 1 except that the positive electrode and the negative electrode prepared in Comparative Example 1 were used.

Comparative Example 2

Preparation of Positive Electrode (Wet)

A positive electrode was prepared in the same manner as in Comparative Example 1.

Preparation of Negative Electrode (Powder (Granule))

A negative electrode was prepared in the same manner as in Example 1.

Preparation of Secondary Battery

Coin cell, bi-cell and stack cell secondary batteries were prepared in the same manner as in Example 1 except that the positive electrode and the negative electrode prepared in Comparative Example 2 were used.

Comparative Example 3

Preparation of Positive Electrode (Fiberized Binder)

A positive electrode was prepared in the same manner as in Example 1.

Preparation of Negative Electrode (Fiberized Binder)

A mixture was prepared by putting 96 parts by weight of natural graphite with a sphericity of 0.95 and artificial graphite with a sphericity of 0.9 (weight ratio of the natural graphite and the artificial graphite=20:80), as negative electrode active materials, 1 part by weight of carbon black (SuperC65) as a negative electrode conductive material and 3 parts by weight of polytetrafluoroethylene (PTFE) as a negative electrode binder in a blender and mixing at 10,000 rpm for 1 minute. After stabilizing a kneader at a temperature of 150° C. and putting the mixture in the kneader, a mixture lump was obtained by operating the kneader at a pressure of 50 atm and a speed of 50 rpm for 5 minutes. The mixture lump was put in a blender, ground at 10,000 rpm for 30 seconds, and then classified through a sieve with a pore size of 1 mm to obtain a mixture powder for an electrode. Then, a film for a negative electrode was prepared by putting the prepared mixture powder for an electrode in a lab calendar (roll diameter: 88 mm, roll temperature: 100° C.). Two sheets of the film for a negative electrode were placed on both sides of an aluminum foil (10 μm) coated with a conductive primer layer wherein carbon black and an acryl-based binder were mixed at a weight ratio of 5:6 and a negative electrode was prepared through lamination using a compression roll maintained at 150° C.

Preparation of Secondary Batteries

Coin cell, bi-cell and stack cell secondary batteries were prepared in the same manner as in Example 1 except that the positive electrode and the negative electrode prepared in Comparative Example 3 were used.

Comparative Example 4

In Comparative Example 4, it was intended to prepare a positive electrode using a granule (powder) for a positive electrode active material layer and a negative electrode using a granule (powder) for a negative electrode active material layer and prepare a secondary battery using the positive electrode and the negative electrode.

Preparation of Positive Electrode (Powder (Granule))

A slurry with a viscosity of about 1000 cPs was prepared by mixing lithium nickel cobalt manganese aluminum oxide (NCMA, $Li[Ni_{0.88}Co_{0.07}Mn_{0.04}]Al_{0.01}O_2$) as a positive electrode active material, carbon black as a positive electrode conductive material, a carboxymethyl cellulose aqueous solution (Daicel 2200, solid content: 1.5 wt %) as a positive electrode dispersant and a modified styrene-butadiene copolymer (AX-B119) as a positive electrode binder in N-methyl-2-pyrrolidone (NMP) as a dispersion medium at a weight ratio of 95.6:1.0:1.1:2.3 using a homogenizer. The solid content of the slurry was 68 wt %.

However, a granule for a positive electrode active material could not be prepared due to the high risk of explosion the organic solvent NMP having a high boiling point during the step of preparing a granule for a positive electrode active material by spray-drying the slurry.

Therefore, a positive electrode using a granule for a positive electrode active material and a secondary battery using the positive electrode could not be prepared.

Comparative Example 5

Preparation of Positive Electrode (Fiberized Binder)

A positive electrode was prepared in the same manner as in Example 1.

Preparation of Negative Electrode (Wet)

A negative electrode was prepared in the same manner as in Comparative Example 1.

Preparation of Secondary Batteries

Coin cell, bi-cell and stack cell secondary batteries were prepared in the same manner as in Example 1 except that the positive electrode and the negative electrode prepared in Comparative Example 5 were used.

Comparative Example 6

Preparation of Positive Electrode (Wet)

A positive electrode was prepared in the same manner as in Comparative Example 1.

Preparation of Negative Electrode (Fiberized Binder)

A mixture was prepared by putting 96 parts by weight of natural graphite with a sphericity of 0.95 and artificial graphite with a sphericity of 0.9 (weight ratio of the natural graphite and the artificial graphite=20:80), as negative electrode active materials, 1 part by weight of carbon black (SuperC65) as a negative electrode conductive material and 3 parts by weight of polytetrafluoroethylene (PTFE) as a negative electrode binder in a blender and mixing at 10,000 rpm for 1 minute. After stabilizing a kneader at a temperature of 150° C. and putting the mixture in the kneader, a mixture lump was obtained by operating the kneader at a pressure of 50 atm and a speed of 50 rpm for 5 minutes. The mixture lump was put in a blender, ground at 10,000 rpm for 30 seconds, and then classified through a sieve with a pore size of 1 mm to obtain a mixture powder for an electrode. Then, a film for a negative electrode was prepared by putting the prepared mixture powder for an electrode in a lab calendar (roll diameter: 88 mm, roll temperature: 100° C.). Two sheets of the film for a negative electrode were placed on both sides of a copper foil (10 μm) coated with a conductive primer layer wherein carbon black and an acryl-based binder were mixed at a weight ratio of 5:6 and a negative electrode was prepared through lamination using a compression roll maintained at 150° C.
Preparation of Secondary Batteries Coin cell, bi-cell and stack cell secondary batteries were prepared in the same manner as in Example 1 except that the positive electrode and the negative electrode prepared in Comparative Example 6 were used.

Comparative Example 7

In Comparative Example 7, it was intended to prepare a positive electrode using a granule (powder) for a positive electrode active material layer and a negative electrode by the wet method and prepare a secondary battery using the positive electrode and the negative electrode.
Preparation of Positive Electrode (Powder (Granule))

A slurry with a viscosity of about 1000 cPs was prepared by mixing lithium nickel cobalt manganese aluminum oxide (NCMA, $Li[Ni_{0.88}Co_{0.07}Mn_{0.04}]Al_{0.01}O_2$) as a positive electrode active material, carbon black as a positive electrode conductive material, a carboxymethyl cellulose aqueous solution (Daicel 2200, solid content: 1.5 wt %) as a positive electrode dispersant and a modified styrene-butadiene copolymer (AX-B119) as a positive electrode binder in N-methyl-2-pyrrolidone (NMP) as a dispersion medium at a weight ratio of 95.6:1.0:1.1:2.3 using a homogenizer. The solid content of the slurry was 68 wt %.

However, a granule for a positive electrode active material could not be prepared due to the high risk of explosion the organic solvent NMP having a high boiling point during the step of preparing a granule for a positive electrode active material by spray-drying the slurry.

Therefore, a positive electrode using a granule for a positive electrode active material and a secondary battery using the positive electrode could not be prepared.

Comparative Example 8

In Comparative Example 8, it was intended to prepare a positive electrode using a granule (powder) for a positive electrode active material layer and a negative electrode using a fiberized binder and prepare a secondary battery using the positive electrode and the negative electrode.
Preparation of Positive Electrode (Powder (Granule))

A slurry with a viscosity of about 1000 cPs was prepared by mixing lithium nickel cobalt manganese aluminum oxide (NCMA, $Li[Ni_{0.88}Co_{0.07}Mn_{0.04}]Al_{0.01}O_2$) as a positive electrode active material, carbon black as a positive electrode conductive material, a carboxymethyl cellulose aqueous solution (Daicel 2200, solid content: 1.5 wt %) as a positive electrode dispersant and a modified styrene-butadiene copolymer (AX-B119) as a positive electrode binder in N-methyl-2-pyrrolidone (NMP) as a dispersion medium at a weight ratio of 95.6:1.0:1.1:2.3 using a homogenizer. The solid content of the slurry was 68 wt %.

However, a granule for a positive electrode active material could not be prepared due to the high risk of explosion the organic solvent NMP having a high boiling point during the step of preparing a granule for a positive electrode active material by spray-drying the slurry.

Therefore, a positive electrode using a granule for a positive electrode active material and a secondary battery using the positive electrode could not be prepared.

Evaluation of Performance

Evaluation of Performance of Secondary Batteries

The secondary batteries prepared in Example 1, Comparative Example 1, Comparative Example 2, Comparative Example 3, Comparative Example 5 and Comparative Example 6 were evaluated as follows. For Comparative Examples 4, 7 and 8, evaluation was not performed because secondary batteries could not be prepared.

Evaluation methods are as follows.

(1) Evaluation of Initial Efficiency

The coin-cell secondary battery was charged at 25° C. to 4.2 V with a constant current (CC) of 0.1 C and then to 0.005 C (cut-off current) at a constant voltage (CV). The battery was allowed to stand for 20 minutes and then discharged to 2.5 V at a constant current (CC) of 0.1 C. After measuring charge capacity and discharge capacity, initial efficiency was calculated from the following equation.

$$\text{Initial efficiency (\%)} = [(\text{discharge capacity})/(\text{charge capacity})] \times 100$$

The result is given in Table 1.
(2) Evaluation of 1 C Discharge Rate

The coin cell was charged to 4.2V at 0.2 C and then cut off at 0.005 C (CC-CV charging). The coin cell was allowed to stand for 20 minutes and then discharged to 2.5 V at a constant current of 1.0 C.

Discharge rate was calculated by dividing the discharge capacity by 0.1 C discharge capacity.

$$\text{1 C discharge} = \text{1.0 C discharge capacity}/\text{0.1 C distance capacity}$$

(3) Evaluation of QC Rapid Charging

The coin cell was charged and discharged once at 0.2 C to the SOC0 state and then charged at 1.0 C. The SOC at the third point where the slope of the second derivative curve of the charging curve turns from negative to positive values was interpreted as the point where the lithium ions of the negative electrode were deposited and was evaluated as the maximum SOC point at which charging is possible at the corresponding C-rate.

(4) Evaluation of Resistance Characteristics (Discharge at SOC50)

Discharge resistance at SOC50 was measured according to the common monocell evaluation method. After measuring capacity three times at 0.33 C and charging fully, discharge resistance was measured for each SOC and the discharge resistance at SOC50 was recorded.

(5) Evaluation of Life Characteristics (Capacity Retention Rate after 200 Cycles)

The bi-cell secondary batteries prepared in Example 1, Comparative Example 1, Comparative Example 2 and Comparative Example 5 were charged at 25° C. with 0.5% cut-off to 4.2 V at a constant current of 0.33 C and a constant voltage. Then, the batteries were discharged to 2.5 V at a constant current of 0.33 C. This charge-discharge cycle was repeated 200 times. Capacity retention rate was calculated by the following equation.

$$\text{Capacity retention rate} = [(\text{capacity after 200 cycles})/(\text{capacity after first cycle (initial capacity)})] \times 100$$

The result is given in Table 2.

(6) Evaluation of Initial Resistance (SOC50 Discharge Resistance)

The stack cell secondary battery was charged and discharged three times at a rate of 0.33 C. The discharge capacity at the third time was determined as SOC and charging and discharging were conducted at a rate of 1.5 C and 2.5 C. SOC95, 10 and 5 were evaluated with a pulse of 1.5 C, and SOC80, 50 and 20 were evaluated with a pulse of 2.5 C. Between the pulses of charging and discharging for resistance measurement, the consumed capacity was supplemented at 0.2 C. During the transition of SOC, charging and discharging were performed at a rate of 0.33 C and pulse measurement was made at a very short interval of less than 1 second. Initial discharge resistance was calculated by dividing the measured voltage drop by the discharge current.

Figure 8:
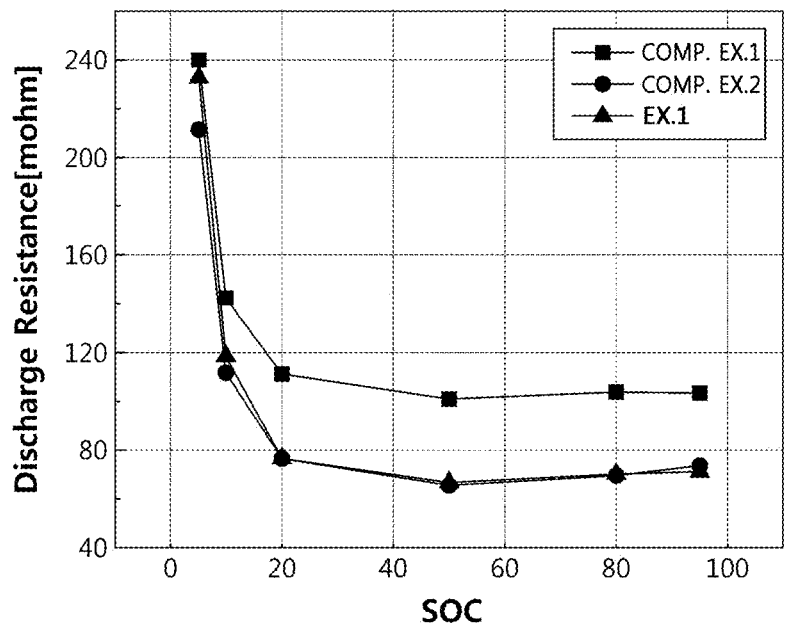
FIG. 8 shows the initial discharge resistance of secondary batteries prepared in Example 1, Comparative Example 1 and Comparative Example 2 depending on SOC.

The result is shown in Table 3 and FIG. 8.

(7) Evaluation of Initial Resistance (SOC50 Charge Resistance)

Initial charge resistance was calculated by dividing voltage rise during charging by the charge current.

Figure 9:
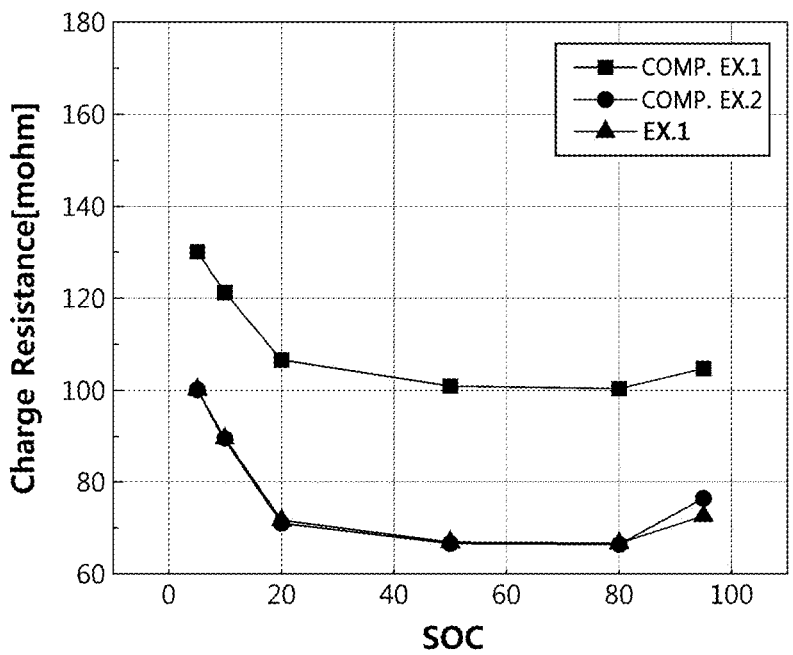
FIG. 9 shows the initial charge resistance of secondary batteries prepared in Example 1, Comparative Example 1 and Comparative Example 2 depending on SOC.

The result is shown in Table 3 and FIG. 9.

(8) Evaluation of Rapid Charging (SOC10 Voltage Rise)

The SOC10 measurement result during the evaluation of the initial charge resistance was plotted depending on time and voltage. The voltage change during SOC10 charging was recorded to predict the change in resistance to rapid charging while the battery is discharged. It can be seen which resistance component affects rapid charging from the change in voltage with time.

Figure 10:
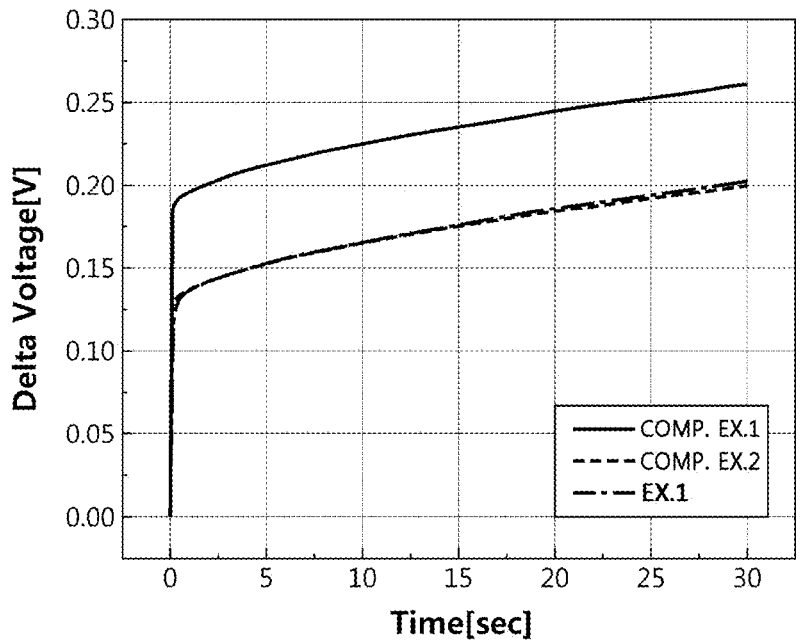
FIG. 10 shows the change in voltage rise of secondary batteries prepared in Example 1, Comparative Example 1 and Comparative Example 2 during rapid charging.

The result is shown in Table 3 and FIG. 10.

(9) Evaluation of Life Characteristics (Capacity Retention Rate after 200 Cycles)

The stack cell secondary batteries prepared in Example 1, Comparative Example 1 and Comparative Example 2 were charged at 45° C. with 0.5% cut-off to 4.2 V at a constant current of 0.33 C and a constant voltage. Then, the batteries were discharged to 2.5 V at a constant current of 0.33 C. This charge-discharge cycle was repeated 200 times. Capacity retention rate was calculated by the following equation.

Capacity retention rate = [(capacity after 200 cycles)/(capacity after first cycle (initial capacity))] × 100

Figure 11:
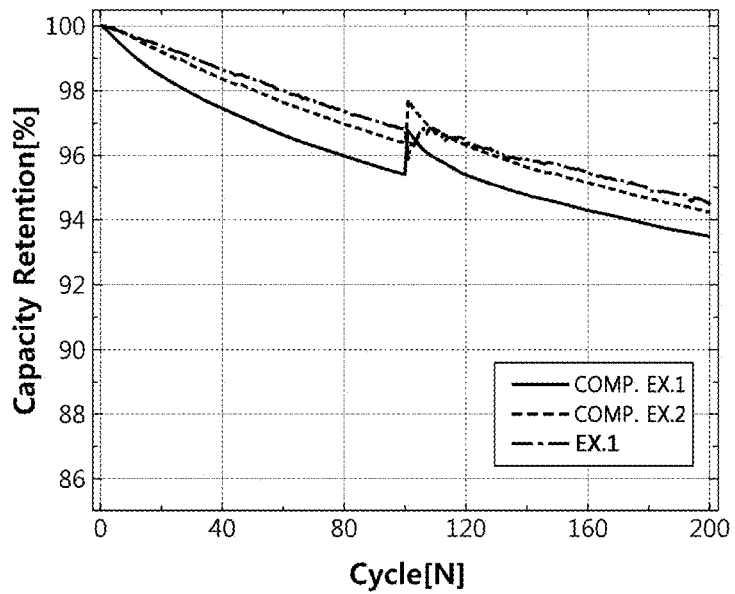
FIG. 11 shows the lifespan characteristics of secondary batteries prepared in Example 1, Comparative Example 1 and Comparative Example 2 during 200 cycles.

The result is shown in Table 3 and FIG. 11.

TABLE 1

| | Classification according to manufacturing method [Positive electrode/negative electrode] | Initial efficiency (%) | 1 C discharge rate (%) | QC rapid charging SOC |
|---|---|---|---|---|
| Comp. Ex. 1 | Wet/wet | 89.8 | 86 | 57 |
| Comp. Ex. 2 | Wet/dry (granule) | 89.8 | 84 | 63 |
| Comp. Ex. 3 | Dry (fiberized binder)/dry (fiberized binder) | 85.1 | 85 | 55 |
| Comp. Ex. 4 | Dry (granule)/Dry (granule) | — | — | — |
| Comp. Ex. 5 | Dry (fiberized binder)/wet | 89.7 | 88 | 58 |
| Comp. Ex. 6 | Wet/dry (fiberized binder) | 85.7 | 79 | 60 |
| Comp. Ex. 7 | Dry (granule)/wet | — | — | — |
| Ex. 1 | Dry (fiberized binder)/dry (granule) | 89.8 | 87 | 63 |
| Comp. Ex. 8 | Dry(granule)/dry (fiberized binder) | — | — | — |

TABLE 2

| | Classification according to manufacturing method [Positive electrode/negative electrode] | Resistance characteristics (SOC 50 discharge (ohm)) | Capacity retention rate after 200 cycles (%) |
|---|---|---|---|
| Comp. Ex. 1 | Wet/wet | 1.44 | 92.8 |
| Comp. Ex. 2 | Wet/dry (granule) | 1.47 | 92.9 |
| Comp. Ex. 5 | Dry (fiberized binder)/wet | 1.35 | 93.3 |
| Ex. 1 | Dry (fiberized binder)/dry (granule) | 1.40 | 94.5 |

TABLE 3

| | Classification according to manufacturing method [Positive electrode/negative electrode] | Initial resistance (SOC50 discharge resistance (mohm)) | Initial resistance (SOC50 charge resistance (mohm)) | Rapid charging (SOC10 voltage rise) (V) | Capacity retention rate after 200 cycles (%) |
|---|---|---|---|---|---|
| Comp. Ex. 1 | Wet/wet | 101 | 102 | 0.26 | 93.5 |
| Comp. Ex. 2 | Wet/dry (granule) | 66 | 67 | 0.20 | 94.2 |
| Ex. 1 | Dry (fiberized binder)/dry (granule) | 66 | 67 | 0.20 | 94.5 |

Referring to Tables 1-3 and FIGS. 8-11, the secondary battery of Example 1 including a positive electrode prepared using a fiberized binder and a negative electrode prepared using a granule, both prepared by the dry method, exhibited superior initial efficiency, low initial resistance, low voltage rise during charging (which is favorable for rapid charging) and improved lifespan characteristics as compared to the secondary battery of Comparative Example 1, wherein both the positive electrode and the negative electrode were prepared by the wet method, and the secondary batteries of Comparative Example 2, Comparative Example and Comparative Example 6, wherein one of the positive electrode and the negative electrode was prepared by the wet method and the other was prepared by the dry method. Specifically, although the electrochemical reaction rate at the positive electrode is increased when a fiberized binder is used in the positive electrode, the improved electrochemical reaction rate at the positive electrode cannot be utilized unless the reaction rate at the negative electrode is increased too. For the secondary battery of Example 1 including a positive electrode prepared using a fiberized binder and a negative electrode prepared using a granule, the reaction rate is also increased at the negative electrode. Therefore, the electrochemical reaction rate at the positive electrode and the negative electrode is balanced and the overall lifespan characteristics of the secondary battery can be improved remarkably.

The invention claimed is:
1. A secondary battery comprising:
a positive electrode comprising:
   a positive electrode current collector, and
   a positive electrode active material layer located on the positive electrode current collector and comprising a positive electrode active material, a positive electrode conductive material, and a positive electrode binder comprising polytetrafluoroethylene (PTFE),
wherein the positive electrode active material layer is formed by a dry process,
   wherein the positive electrode binder is fiberized and binds the positive electrode active material and the positive electrode conductive material,
   wherein the positive electrode has a bending resistance lower than 10 mm Φ,
   wherein the positive electrode binder comprised in the positive electrode active material layer has a crystallinity of 10% or lower;
a negative electrode comprising:
   a negative electrode current collector, and
   a negative electrode active material layer located on the negative electrode current collector and comprising a plurality of granules comprising a negative electrode active material and a negative electrode binder, wherein the negative electrode active material layer is formed by a spray-drying process,
      wherein the plurality of granules have a structure in which the negative electrode binder binds the negative electrode active material; and
   a separator disposed between the positive electrode and the negative electrode.
2. The secondary battery according to claim 1, wherein the bending resistance of the positive electrode is defined according to JIS K5600-5-1.
3. The secondary battery according to claim 1, wherein the bending resistance of the positive electrode is defined by:
preparing a rectangular positive electrode sample with a size of 100 mm×50 mm;
preparing measuring rods having diameters of 2, 3, 4, 5, 6, 8, 10, 12, 16, 20, 25 and 32 mm respectively,
contacting the positive electrode sample with a measuring rod with a largest diameter, and
determining whether a crack occurs in a mixed film of the positive electrode sample when both ends of the positive electrode sample are lifted;
repeating the determining of whether the crack occurs in the mixed film of the positive electrode sample using a measuring rod with a next largest diameter if the crack has not occurred in the previous step; and
defining the bending resistance as a minimum diameter of the measuring rod when no crack occurs in the mixed film of the positive electrode sample.
4. The secondary battery according to claim 1, wherein the positive electrode active material layer has a porosity of 20-35%.
5. The secondary battery according to claim 1, wherein a loading amount of the positive electrode active material in the positive electrode active material layer is 3-15 mAh/cm$^2$.
6. The secondary battery according to claim 1, wherein an interfacial resistance between the positive electrode active material layer and the positive electrode current collector is 5 Ω·cm$^2$ or lower.
7. The secondary battery according to claim 1, wherein
   the positive electrode binder comprises a fluorine-based positive electrode binder,
   the positive electrode active material layer has a positive electrode QBR (quantified binder ratio) of 1.1 or lower, and
   the positive electrode QBR is defined by the following equation:
   Positive electrode QBR=$CB_s/CB_f$
   wherein $CB_s$ is an average fluorine content in a surface region of the positive electrode active material layer from an outermost surface of the positive electrode active material layer to 15% of a total thickness of the positive electrode active material layer, and $CB_f$ is an average fluorine content in a floor region of the positive electrode active material layer from an interface of the positive electrode active material layer contacting with the positive electrode current collector to 15% of the total thickness of the positive electrode active material layer.
8. The secondary battery according to claim 1, wherein the positive electrode conductive material comprises one or more of activated carbon, graphite, carbon black, ketjen black or carbon nanotube.
9. The secondary battery according to claim 1, wherein the positive electrode active material layer comprises 85-98 parts by weight of the positive electrode active material 0.5-5 parts by weight of the positive electrode conductive material and 0.5-10 parts by weight of the positive electrode binder.
10. The secondary battery according to claim 1, wherein a conductive primer is provided wholly or partially coated on the positive electrode current collector.
11. The secondary battery according to claim 1, wherein the granule comprised in the negative electrode has: a core part comprising the negative electrode active material; and a surface part located wholly or partially outside the core part and comprising the negative electrode binder binding the negative electrode active material.
12. The secondary battery according to claim 11, wherein the negative electrode binder comprised in the surface part of the granule is connected with the negative electrode binder in the surface part of a neighboring granule, so that the negative electrode binder is distributed in the active material layer to have a network structure.

13. The secondary battery according to claim 1, wherein the negative electrode binder has a double bond,
the negative electrode active material layer has a negative electrode QBR (quantified binder ratio) of 2.0 or lower, and
the negative electrode QBR is defined by the following equation:

Negative electrode QBR=$AB_s/AB_f$ wherein $AB_s$ is an average double bond content of the negative electrode binder in a surface region of the negative electrode active material layer from an outermost surface of the negative electrode active material layer to 15% of a total thickness of the negative electrode active material layer, and $AB_f$ is an average double bond content of the negative electrode binder in a floor region of the negative electrode active material layer from an interface of the negative electrode active material layer contacting with the negative electrode current collector to 15% of the total thickness of the negative electrode active material layer.

14. The secondary battery according to claim 1, wherein the granule has a higher electrode binder content (wt %) in a surface part than in a core part based on 100 wt % of the negative electrode active material and the negative electrode binder, and the surface part is a region near a surface of the granule from a granule surface to a predetermined depth toward the center of the granule, and the core part is a region other than the surface part.

15. The secondary battery according to claim 1, wherein the negative electrode active material layer comprises the plurality of granules comprising the negative electrode active material, a negative electrode conductive material, and the negative electrode binder, and formed as the negative electrode binder binds the negative electrode active material and the negative electrode conductive material.

16. The secondary battery according to claim 15, wherein the negative electrode active material layer comprises 85-98 parts by weight of the negative electrode active material, 0.5-5 parts by weight of the negative electrode conductive material and 0.5-10 parts by weight of the negative electrode binder.

17. The secondary battery according to claim 1, wherein
a primer layer is formed wholly or partially on at least one side of the negative electrode current collector,
the primer layer comprises a binder and a conductive material, and
a sum of contents of the binder and the conductive material based on a total weight of the primer layer is 90 wt % or larger.

18. An energy storage device comprising the secondary battery according to claim 1 as a unit cell.

* * * * *